United States Patent
Lof et al.

(10) Patent No.: US 11,273,499 B2
(45) Date of Patent: Mar. 15, 2022

(54) TURNING INSERT

(71) Applicant: SANDVIK INTELLECTUAL PROPERTY AB, Sandviken (SE)

(72) Inventors: Ronnie Lof, Sandviken (SE); Adam Johansson, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/289,087

(22) Filed: Oct. 7, 2016

(65) Prior Publication Data

US 2017/0100777 A1 Apr. 13, 2017

(30) Foreign Application Priority Data

Oct. 9, 2015 (EP) ..................................... 15189172

(51) Int. Cl.
*B23B 27/16* (2006.01)
*B23B 1/00* (2006.01)

(52) U.S. Cl.
CPC .............. *B23B 27/164* (2013.01); *B23B 1/00* (2013.01); *B23B 27/1651* (2013.01);
(Continued)

(58) Field of Classification Search
CPC ... B23B 27/145; B23B 27/16; B23B 27/1614; B23B 27/1625; B23B 27/1622;
(Continued)

(56) References Cited

U.S. PATENT DOCUMENTS 3,629,919 A * 12/1971 Trevarrow, Jr. ......... B23B 27/06
407/103
4,065,223 A 12/1977 Nelson
(Continued)

FOREIGN PATENT DOCUMENTS

CN 103357907 A 10/2013
EP 0699495 A1 3/1996
(Continued)

OTHER PUBLICATIONS

JP 2007-0759932 Machine Translation, pp. 7-14, Feb. 8, 2018.*
JP 2009-66746 Machine Translation, pp. 9-20, Sep. 25, 2018.*

*Primary Examiner* — Nicole N Ramos
(74) *Attorney, Agent, or Firm* — Corinne R. Gorski

(57) ABSTRACT

A turning insert includes a top surface, an opposite bottom surface, a reference plane located parallel to and between the top surface and the bottom surface, and a center axis extending perpendicular to the reference plane and intersecting the reference plane (RP), the top surface and the bottom surface. Side surfaces connect the top surface and the bottom surface. Three nose portions are formed symmetrically relative to the center axis. Each nose portion includes a first cutting edge, a second cutting edge and a convex nose cutting edge connecting the first) and second cutting edges. In a top view the first and second cutting edges on the same nose portion form a nose angle of 25-50° relative to each other. The distance from the first cutting edge to the reference plane varies in such a way that that this distance is decreasing at increasing distance from the nose cutting edge.

19 Claims, 10 Drawing Sheets

(52) U.S. Cl.
CPC ... *B23B 2200/049* (2013.01); *B23B 2200/081* (2013.01); *B23B 2200/125* (2013.01); *B23B 2200/165* (2013.01); *B23B 2200/201* (2013.01); *B23B 2200/202* (2013.01); *B23B 2200/321* (2013.01)

(58) Field of Classification Search
CPC .............. B23B 27/1659; B23B 27/164; B23B 27/1644; B23B 27/1651; B23B 27/1666; B23B 27/1677; B23B 2200/048; B23B 2200/049; B23B 2200/0495; B23B 2200/081; B23B 2200/161; B23B 2200/166; B23B 2200/168; B23B 29/043; Y10T 407/23
See application file for complete search history.

(56) References Cited

U.S. PATENT DOCUMENTS

| | | | | |
|---|---|---|---|---|
| 4,288,179 A * | 9/1981 | Kruger | ................ | B23B 27/143 |
| | | | | 407/114 |
| 4,315,706 A * | 2/1982 | Erkfritz | .............. | B23B 27/1611 |
| | | | | 407/101 |
| 4,318,644 A * | 3/1982 | Seidel | ................. | B23B 27/143 |
| | | | | 407/114 |
| 4,359,300 A | 11/1982 | Hazra et al. | | |
| 4,411,565 A * | 10/1983 | Hazra | ................. | B23B 27/143 |
| | | | | 407/114 |
| 4,632,608 A | 12/1986 | Blomberg et al. | | |
| 5,044,839 A * | 9/1991 | Takahashi | ............. | B23B 27/143 |
| | | | | 407/114 |
| 5,503,509 A * | 4/1996 | von Haas | ............. | B23B 51/048 |
| | | | | 408/188 |
| 5,810,518 A * | 9/1998 | Wiman | ................ | B23B 27/065 |
| | | | | 407/102 |
| 5,921,721 A * | 7/1999 | Hintze | ................ | B23B 27/1622 |
| | | | | 407/113 |
| 6,527,485 B1 | 3/2003 | Little | | |
| 7,300,232 B2 * | 11/2007 | Wiman | ................ | B23B 27/145 |
| | | | | 407/101 |
| 7,645,100 B2 * | 1/2010 | Andersson | ........... | B23B 27/065 |
| | | | | 407/113 |
| 8,708,616 B2 * | 4/2014 | Smilovici | ................ | B23C 5/06 |
| | | | | 407/113 |
| 2006/0216121 A1 * | 9/2006 | Edler | ................ | B23B 27/1611 |
| | | | | 407/104 |
| 2009/0092455 A1 | 4/2009 | Meyer et al. | | |
| 2014/0010607 A1 * | 1/2014 | Wandeback | .......... | B23F 21/128 |
| | | | | 407/113 |
| 2014/0294525 A1 * | 10/2014 | Hecht | .................. | B23B 27/145 |
| | | | | 407/103 |
| 2015/0273590 A1 * | 10/2015 | Muthuswamy | ....... | B23B 27/145 |
| | | | | 407/66 |
| 2016/0107248 A1 * | 4/2016 | Smycek | ................ | B23C 5/207 |
| | | | | 407/33 |
| 2016/0228952 A1 * | 8/2016 | Kobayashi | ........... | B23B 27/143 |
| 2017/0066060 A1 | 3/2017 | Tsuda | | |

FOREIGN PATENT DOCUMENTS

| | | | | |
|---|---|---|---|---|
| EP | 0804313 B1 | 4/2002 | | |
| EP | 1454690 A1 | 9/2004 | | |
| EP | 1920862 A2 | 5/2008 | | |
| EP | 2805786 A1 | 11/2014 | | |
| GB | 2081142 A | 2/1982 | | |
| JP | S52101786 A | 8/1977 | | |
| JP | 2004098185 A | 4/2004 | | |
| JP | 2007075932 A * | 3/2007 | | |
| JP | 2008207292 A | 9/2008 | | |
| JP | 2009066746 A * | 4/2009 | ........ | B23B 27/1625 |
| JP | 4797526 B2 | 10/2011 | | |
| WO | 200862825 A1 | 5/2008 | | |
| WO | 2008062825 A1 | 5/2008 | | |
| WO | WO-2015046558 A1 * | 4/2015 | .......... | B23B 27/143 |
| WO | 2015194701 A1 | 12/2015 | | |

* cited by examiner

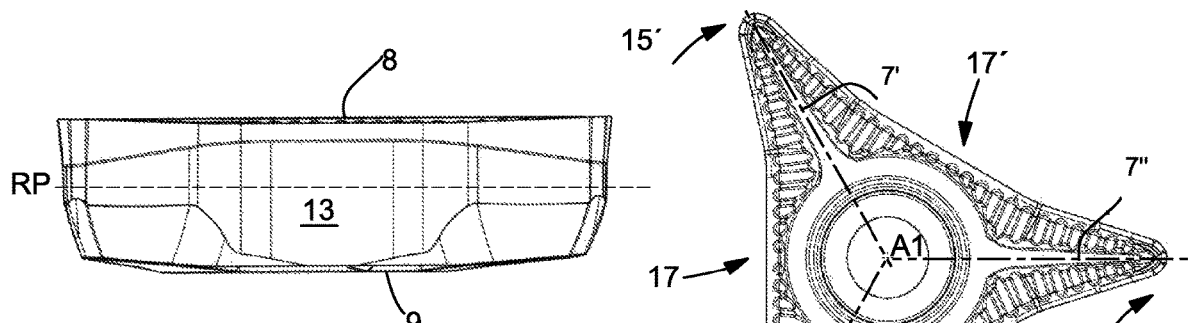
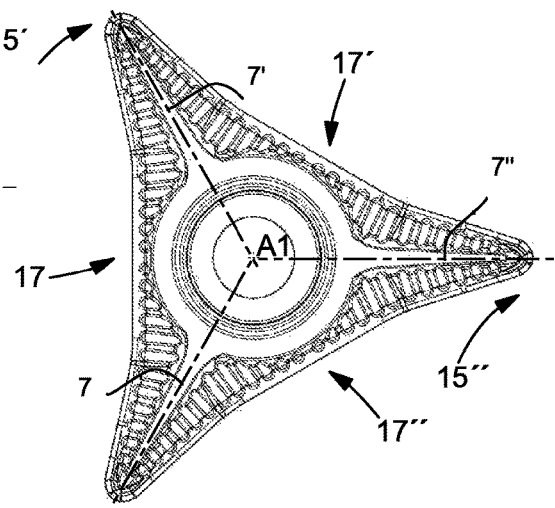
*Fig 19B*
*Fig 19C*
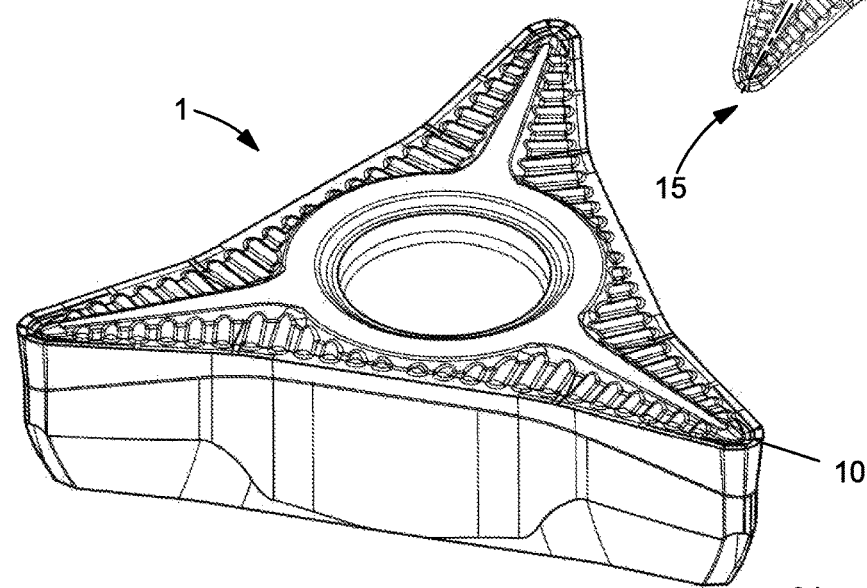
*Fig 19A*
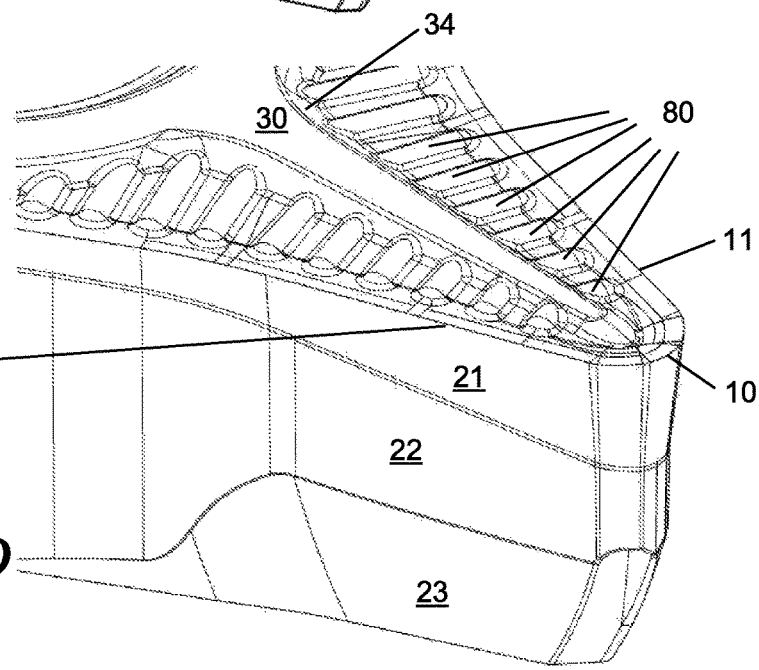
*Fig 19D* ered as a TURNING INSERT

RELATED APPLICATION DATA

This application claims priority under 35 U.S.C. § 119 to EP Patent Application No. 15189172.8, filed on Oct. 9, 2015, which the entirety thereof is incorporated herein by reference.

TECHNICAL FIELD

The present disclosure relates to the technical field of metal cutting. More specifically to the field of turning inserts used for metal cutting in machines such as CNC-machines.

BACKGROUND

The present disclosure refers to a turning insert and a turning tool including such turning insert, and a method to machine a metal work piece using such turning tool.

In turning of a metal work piece, the metal work piece rotates around a center axis. The metal work piece is clamped at one end by rotatable clamping means such as one or more chuck or jaws. The end of the work piece, which is clamped can be called a clamping end or a driving end. For stable clamping, the clamping end or the driving end of the metal work piece may have a larger diameter than the opposite end of the metal work piece and/or has a larger diameter of a portion of the metal work piece located between the clamping end and the opposite end. Alternatively, the metal work piece may have a constant diameter before a machining, i.e. metal cutting, operation.

The turning insert is moved in relation to the metal work piece. This relative movement is called feed. The movement of the turning insert can be in a direction parallel to the center axis of the metal work piece, this is commonly called longitudinal feed or axial feed. The movement of turning insert can furthermore be in a direction perpendicular to the center axis of the metal work piece, this is commonly called radial feed or facing. Other angles of movement, or feed directions, are also possible, this is commonly known as copying or copy-turning.

In copying, the feed has both axial and radial components. During the relative movement of the turning insert, material from the metal work piece is removed in the form of chips. The chips are preferably short and/or have a shape or direction of movement which prevents chip jamming and/or do not give a poor surface finish of the machined surface.

A common shape of turning insert which can be used for a wide range of feed direction is the triangular turning insert. Such insert has in a top view, i.e. a rake face towards the viewer, the shape of a triangle where all three sides are of equal length and where the nose angle is 60°. The corners of the triangle are in the form of nose cutting edges, which typically has a radius of curvature in the range of 0.2-2.0 mm. Examples of such turning inserts are commonly designated TNMG and TCMT according to ISO standard, and are commonly made at least partly from coated or uncoated cemented carbide or cubic boron nitride (CBN) or ceramic or cermet.

In radial turning, the feed direction is perpendicular to and towards the rotational axis of the metal work piece. This is called facing. Although radial turning away from the rotational axis of the metal work piece, also known as out-facing, may be advantageous when machining certain components, using common turning inserts such as TNMG or TCMT give disadvantages, such as poor chip control.

The turning inserts in U.S. Pat. No. 4,632,608 is intended to overcome drawbacks in out-facing. The insert includes three nose portions. In one embodiment, the nose portion has a circular shape. A portion of the circular shaped cutting edge is the only active cutting edge in out-facing. In a further embodiment the periphery of each nose portion consists of a number of cambered segments, where the nose angle is 60°. For this embodiment, in out-facing, a portion of a straight cutting edge and a portion of a convexly curved nose cutting edge is the only active cutting edge in out-facing. The turning inserts in U.S. Pat. No. 4,632,608 can be used for machining two walls forming an external 90° corner in a metal work piece, where one wall, at a greater distance from the rotational axis, is perpendicular to the rotational axis and one cylindrical wall, at a smaller distance from the rotational axis, is parallel to the rotational axis, where the two walls are connected by a circular or curved segment. An external 90° corner in this context is a 90° corner formed on or at an external or outer surface of a metal work piece, such that the cylindrical wall or cylindrical surface is facing away from the rotational axis. This is in contrast to any corner which may be formed on or at an internal or inner surface inside a bore concentric with the rotational axis.

The circular or curved segment is in a cross section in a plane including the rotational axis in the shape of an arc, in the shape of a quarter of a circle or a quarter of a shape which is substantially a circle, which has the same radius of curvature as the nose cutting edge of the turning insert. The circular or curved segment alternatively has a greater radius of curvature than the nose cutting edge of the turning insert.

More specifically, in U.S. Pat. No. 4,632,608, the machining of the two walls forming an external 90° corner is made by an axial turning operation followed by an out-facing operation, where the same portion of the active nose portion is active in both operations. In the above mentioned axial turning operation, which is towards the clamping end of the metal work piece and towards the wall of the corner which is perpendicular to the rotational axis of the metal work piece, the inventors have found that chip control is reduced as the turning insert is moved closer to above mentioned wall which extends perpendicular to the rotational axis at a greater distance from rotational axis.

SUMMARY

To overcome the above disadvantages, the present disclosure is directed to a way to machine two wall surfaces forming an external 90° corner in a metal work piece that is more effective with regards to insert wear and/or chip breaking and/or chip control, and that a new turning insert gives further improvements compared to previously known turning inserts.

The present disclosure provides a turning insert including three nose portions, suitable for machining two wall surfaces forming an external 90° corner in a metal work piece, which has improved chip breaking and/or chip control in an out-facing operation, i.e. when turning or feeding in a direction from and perpendicular to the rotational axis of a metal work piece.

A further aspect is to provide a turning insert which gives an improved chip breaking and/or chip control and/or tool life when moving the insert parallel to the rotational axis, i.e. axial feed, away from the clamping end of the metal work piece.

A still further aspect is to provide a turning insert which has a surface generating active nose cutting edge on or at an active nose portion, which can be used in both axial feed in opposite directions and radial feed in opposite directions, where the same active nose portion can be used for machining a 90° corner formed by two walls connected by a curved segment having the same radius of curvature as the nose cutting edge of the turning insert, without reorientation of the turning insert.

A still further aspect is to provide a turning insert which is versatile regarding feed directions, and which types of components that can be produced by a single turning insert without any reorientation.

The above can be achieved with the initially defined turning insert, which in a top view the first and second cutting edges on or at the same nose portion form a nose angle α of 25-50° relative to each other, and wherein the distance from the first cutting edge to the reference plane RP decreases at increasing distance from the nose cutting edge. By such a turning insert, the the chip breaking and/or chip control and/or tool life, i.e. insert wear, is improved, in out-facing and in axial turning away from the clamping end of the metal work piece.

By such a turning insert, two walls forming an external 90° corner can be machined efficiently with one nose portion of one turning insert in one position or orientation, with out-facing and axial turning away from the clamping end of the work piece, i.e. axial turning away from the wall which extends perpendicular to the rotational axis of the metal work piece. An external 90° corner in this context includes one wall, at a greater distance from the rotational axis, which is perpendicular to the rotational axis and one cylindrical wall, at a smaller distance from the rotational axis, which is parallel to the rotational axis, where the two walls are connected by a circular or curved segment.

An external 90° corner in this context is a 90° corner formed on or at an external or outer surface of a metal work piece, such that the cylindrical wall or cylindrical surface is facing away from the rotational axis. This is in contrast to any corner which may be formed on or at an internal or inner surface inside a bore concentric with the rotational axis.

The top surface includes a rake face. The bottom surface includes a seating surface. The reference plane is parallel to a plane in which the nose cutting edges are located. The nose cutting edges are preferably the cutting edges which are located at a greatest distance from the reference plane. The nose cutting edges are located at equal distances from the center axis. The center axis passes through a geometrical center of the insert. The center axis can be located in the center of a through hole for a clamping screw.

The nose portions are formed symmetrically around the center axis, i.e. each nose portion forms an angle of 120° relative to each other nose portion. A nose portion is a distal portion of the turning insert, in relation to the center of the turning insert. At least a portion of one nose portion is active, i.e. is in contact with the metal work piece, during machining. Each nose portion includes cutting edges at least adjacent to or bordering to the top surface.

The turning insert may be double-sided or reversible, i.e. the bottom surface has a similar or identical set of cutting edges as the top surface. The nose cutting edges form the most distal portions of the turning insert, in other words, the nose cutting edges are the parts of the cutting insert which are located at the greatest distance from the center axis of the turning insert.

A nose portion is a peripheral portion of the cutting insert where a rake face is formed on or at the top surface between the first, second and nose cutting edges. The nose cutting edge has the shape of an arc or a portion of a circle having its center between the first and second cutting edge, wherein the circle preferably has a radius of 0.2-2.0 mm. Alternatively, the nose cutting edge may have the shape of an arc of an ellipse. Alternatively, the nose cutting edge may have a shape of a combination of one or more arcs of circles or arcs of ellipses, as well as straight portions, which together form a nose cutting edge which is convex in a top view. A top view is a view in which the top surface is facing the viewer and the bottom surface is facing away from the viewer.

The first and second cutting edges are preferably straight in a top view. If the first and second cutting edges are not straight in a top view, such as for example slightly convex or slightly concave, the nose angle is measured using straight lines between the end points of the first and second cutting edges respectively. If the first and second edges are slightly convex or slightly concave, the radius of curvature for the first and second cutting edges are more than 5 times, and for example more the 10 times, greater than the radius of curvature for the nose cutting edge.

Alternatively, a nose angle of 25-50° is equal to a nose cutting edge having the shape of a circular arc of an angle of 25-50°. The first and second cutting edges may have an equal length of 2.0-20.0 mm. The distance from the first cutting edge to the reference plane varies in such a way that that this distance is decreasing at the distance from the nose cutting edge increases. In other words, the distance from the first cutting edge to the reference plane is decreasing away from the nose cutting edge, at least for a portion of the first cutting edge. Alternatively formulated, a distance from the reference plane to a first portion of the first cutting edge is greater than a distance from the reference plane to a second portion of the first cutting edge, where the first portion of the first cutting edge is located between the nose cutting edge and the second portion of the first cutting edge. In other words, at least a portion of the first cutting edge is sloping towards the bottom surface and the reference plane away from the nose cutting edge in a side view. For example, a first point of the first cutting edge, adjacent to the nose cutting edge, is located a greater distance from the reference plane than a distance from a second point of the first cutting edge, located at a greater distance from the nose cutting edge than the first point of the first cutting edge, to the reference plane.

All nose cutting edges are preferably located in a common plane parallel to the reference plane. A cutting edge is an edge of the turning insert which borders to a rake face and a clearance surface, also known as a relief surface. The arc length of the nose cutting edge is shorter than both the length of the first cutting edge and the second cutting edge. The turning insert is suitable for both axial feed in opposite directions and radial feed in opposite directions, where the same active nose portion can be used for machining a 90° corner formed by two wall surfaces connected by a curved segment having the same radius of curvature as the nose cutting edge of the turning insert.

Each nose portion forms an angle of 120° around the center axis relative to each other nose portion. The turning insert may be single-sided, i.e. cutting edges only at the border of the top surface, or double-sided, i.e. cutting edges at the borders of the top surface and at the borders of the bottom surface. Preferably the turning insert is single-sided in such a way that the area of the top surface is greater than the area of the bottom surface, where both the top and bottom areas are projected on the reference plane RP.

The turning insert can be made at least partially from a piece of coated or uncoated sintered cemented carbide or cermet. Alternatively, the turning insert may be made at least partially from cubic boron nitride (CBN), poly crystalline diamond (PCD) or ceramic. The turning insert is mountable in a removable manner in a tool body, by means of e.g. a screw or a clamp.

According to an embodiment, the first and second cutting edges are linear or straight in a top view. By such a turning insert, the cutting force direction and/or chip flow direction will be less dependent of the cutting depth, i.e. depth of cut. In this context, a concave or convex radius of curvature greater than 200 mm is considered straight or linear.

According to an embodiment, bisectors extends equidistantly from each pair of first and second cutting edges and each bisector intersects the center axis. By such a turning insert, the risk of interference by non-active nose cutting edges is reduced when machining in two directions which may be perpendicular. By such a turning insert, it is possible to use the insert for metal work pieces clamped at opposite ends. In other words, the first and the second cutting edge formed on or at the same nose portion are located at equal distance from the bisector. Thus, the bisector is located between the first and second cutting edges. The first and second cutting edges are located on or at opposite sides of the bisector. Each bisector forms an angle of 120° relative to any other bisector. Each bisector intersects the center axis. Each bisector intersects the center of the nose cutting edge formed on or at the same nose portion as the first cutting edge and the second cutting edge.

According to an embodiment, indentations are formed in each side surface between each pair of nose cutting edges. By such a turning insert, a larger cutting depth is possible using only the first or the second cutting edge. Indentations, or cut outs, are thus formed in the insert. The indentions are formed in such a way that in a top view, there is no part of the turning insert located at points between and at equidistant lengths from each pair of nose cutting edges. In other words, the turning insert has a shape which in top view is a symmetrical triangle with concave sides of equal length.

According to an embodiment, the top surface includes a protrusion having an extension along the bisector, the protrusion including a first chip breaker wall facing the first cutting edge and a second chip breaker wall facing the second cutting edge. By such a turning insert, the chip breaking and/or chip control is further improved. One further effect is that there is a reduced risk that chips hit the machined surface, which can reduce the surface quality of the machined metal work piece, i.e. the component. The protrusion may extend further away from the reference plane than surrounding portions of the top surface. A rake face is formed between the protrusion and the cutting edges.

According to an embodiment, a distance, measured in a plane perpendicular to the reference plane RP, between the top surface of the protrusion and the lowest point of the first cutting edge is 0.28-0.35 mm. In other words, the height difference in a side view between the top surface, i.e. highest point, of the protrusion and the lowest point of first cutting edge is 0.28-0.35 mm. By such a turning insert, the chip breaking and/or chip control is further improved. One further effect is that there is a reduced risk that chips hit the machined surface, which can reduce the surface quality of the machined metal work piece, i.e. the component.

According to an embodiment, in a top view the distance from the first cutting edge to the first chip breaker wall is increasing away from the nose cutting edge. By such a turning insert, the chip control is further improved. For example, the risk of chip jamming or chips hitting the metal work piece is reduced. The distance is measured in a direction perpendicular to the first cutting edge, and in a plane parallel to the reference plane, to the first chip breaker wall. The protrusion, and thus the first chip breaker wall, does not necessarily have to extend along the whole length of the first cutting edge.

According to an embodiment, a first side surface includes a first clearance surface adjacent to the first cutting edge, a third clearance surface, and a second clearance surface located between the first clearance surface and the third clearance surface, wherein the third clearance surface forms an angle ε in relation to the bottom surface measured in a plane perpendicular to the first cutting edge, wherein the second clearance surface forms an angle σ in relation to the bottom surface measured in a plane perpendicular to the first cutting edge, wherein the first clearance surface forms an angle γ in relation to the bottom surface measured in a plane perpendicular to the first cutting edge, wherein angle σ is greater than angle ε, and wherein the side surfaces of each nose portion are configured symmetrically in relation to a plane perpendicular to the reference plane RP and including the bisector. By such a turning insert, out-facing can be made from a smaller work piece diameter with a reduced decrease in insert strength. When out-facing at smaller diameters, a greater clearance angle is necessary, but that an increase in clearance angle by a constant angle along the side surface would give a reduced strength of the insert.

The second clearance surface which has a relatively smaller clearance angle in relation to the first clearance surface and the third clearance surface has the purpose of increasing the strength of the insert. The third clearance surface is preferably adjacent to the bottom surface. The angles which the clearance surfaces forms are measured in relation to the bottom surface, or alternatively in relation to a plane parallel to the reference plane which intersects the bottom surface. Angle γ may be greater than angle ε and angle σ greater than angle γ.

The distance from the first cutting edge to lower border line of the first clearance surface, i.e. the border line of the first clearance surface located closest to the bottom surface, may be decreasing away from the nose cutting edge. For example, angle γ is 80-88°, angle ε is 75-88° and angle σ is 85-90°. The third clearance surface may be convex as seen in a plane perpendicular to the first cutting edge, for example having a radius of curvature which is more than 10 mm. The height, in a direction perpendicular to the reference plane, of the first clearance surface may be less than the height of the second clearance surface, in order to further increase the strength of the first cutting edge. The height of the first clearance surface may be at least 0.3 mm in order to match maximum flank wear of the first cutting edge.

According to an embodiment, the bottom surface includes rotation prevention means. By such a turning insert, the radial turning in opposite directions and/or axial turning in opposite directions is improved when turning insert is seated in the tool body. The rotation prevention means can be in the form of one or more ridges, grooves, protrusions or cavities, or a combination of such features. The rotation prevention means are suitable for interacting by contact with a corresponding structure in a tool body or a shim seated in a tool body, in which the turning insert can be removably clamped. The rotation prevention means prevents or at least reduces rotation or movement of the turning insert in two opposite directions around the center axis of the turning insert.

According to an embodiment, the bottom surface includes rotation prevention means in the form of three grooves, each groove having a main extension along the bisector located between the adjacent first and second cutting edges. By such a turning insert, the insert is indexable in three positions in the same insert seat. The orientation of the groove is oriented symmetrically in relation to the first and second cutting edges in a way such that there is sufficient rotation prevention both in axial turning in opposite directions and in radial turning in opposite directions (facing and out-facing). In other words, for each nose portion the bisector located between the first and second cutting edges has the same extension as the main extension of the groove in the bottom surface of the insert in the same nose portion. Consequently, all three grooves have a main extension in a direction towards the center axis of the turning insert.

According to an embodiment, the top and bottom surfaces are identical, wherein the rotation prevention means are in the form of a set of surfaces, each surface extending in a plane which forms an angle of 5-60° in relation to the reference plane. By such a configuration, the turning insert can be made double-sided and comprise rotation prevention means. A double-sided, or reversible, turning insert means that the turning insert can be used with the prior bottom surface as rake face.

According to an embodiment, the top surface includes a protrusion having an extension along the bisector, the protrusion including a first chip breaker wall facing the first cutting edge, wherein the top surface includes bumps, wherein the bumps are formed between the bisector and the first cutting edge.

The bumps, or protrusions, protrude from top surface. At least one bump, for example, a plurality of bumps or all bumps, preferably has a width of 0.3-0.5 mm in a top view, and a length of 0.6-1.4 mm in a top view, where the length is perpendicular to the width, and where the width is measured parallel to the adjacent, i.e. associated, first cutting edge. The bumps are formed between the bisector and the first cutting edge, such that the bumps are spaced apart from the bisector and the first cutting edge, respectively. The bumps can be placed such that in a top view, a distance between the first cutting edge and the bumps are 0.4-0.5 mm. The distance is measured perpendicular to the first cutting edge in a top view, to the portion of each respective bump which is closest to the first cutting edge. By such a turning insert, the bumps improve the chip breaking and/or chip control at low feed rates.

According to an embodiment, the nose angle α is less than 35°. By such a turning insert, the versatility of the turning insert is improved.

According to an embodiment, in a side view the first cutting edge forms an angle relative to the reference plane of 1-4° such that a distance from the first cutting edge to the reference plane is continuously decreasing away from the nose cutting edge. In other words, in a side view the first cutting edge is sloping downward, by 1-4°, away from the nose cutting edge, where the top surface is upwards, the bottom surface is downwards, and the reference plane is horizontal. Thus, no portion of the first cutting edge is sloping upwards away from the nose cutting edge.

According to an embodiment, the first cutting edge is linear or straight in a top view from a first end point, where the first cutting edge is connected to the nose cutting edge, up to a second end point, where the first cutting edge intersect an indention formed in a side surface between a pair of nose cutting edges, wherein a distance from the first cutting edge to the reference plane is continuously decreasing from the first end point up to the second end point. In other words, a distance from the second end point to the reference plane is shorter than a distance from the first end point to the reference plane. By such a turning insert, the chip control is further improved especially at higher depths of cut.

According to an embodiment, a turning tool includes a turning insert and a tool body, the tool body having a front end and an opposite rear end, a main extension along a longitudinal axis A2 extending from the front end to the rear end, an insert seat formed in the front end in which the turning insert is mountable such that a bisector of an active nose portion forms an angle θ of 35-55° in relation to the longitudinal axis A2 of the tool body. By such a turning tool, the turning insert is positioned or seated in such a way that a larger range of feed directions are possible.

By such a turning tool, for the same nose portion the first cutting edge can be used in axial turning and the second cutting edge can be used in out facing in such a way that there is a portion of the nose cutting edge that is inactive, i.e. no wear, for both operations, i.e. feed directions. By such a turning tool, an entering angle of the first cutting edge when axial turning away from the clamping end of the metal work piece is less than 45° and at least 10°. Such an entering angle provides reduced insert wear when axial turning in such a way that the insert is moving in a direction away from the clamping end of the metal work piece.

By such a turning tool, the entering angle of the second cutting edge when out facing, i.e. feeding perpendicularly away from the rotational axis of the metal work piece, is less than 45° and at least 10°. Such an entering angle provides reduced insert wear when out facing.

The active nose portion is the nose portion which in a mounted state includes the nose cutting edge which in a top view is the part of the turning insert which is most distal in relation to the rear end of the tool body and in relation to the longitudinal axis of the tool body. The angle which the first cutting edge of the active nose portion forms in relation to the longitudinal axis of the tool body is greater than the angle which the second cutting edge of the active nose portion forms in relation to the longitudinal axis of the tool body. The longitudinal axis of the tool body is preferably perpendicular to the rotational axis of the metal work piece.

The center axis of the turning insert in a mounted state is substantially perpendicular (70°-110°) in relation to the longitudinal axis of the tool body. The insert seat of the tool body may include insert rotation means which corresponds to the insert rotation means formed in the bottom surface of the turning insert. The rear end of the tool body is the part of the tool body which is located at the largest distance from the active nose cutting edge.

According to an embodiment, the sum of the angle θ and half the angle α is equal or greater than 50°, and equal or smaller than 70°. In other words, $50° \leq \theta + (\alpha/2) \leq 70°$. By such a turning tool, the chip breaking and/or chip control is further improved in out-facing and in axial turning away from the clamping end of the metal work piece. By such a turning tool, a 90° external corner can be machined in the metal work piece, where one wall surface of the corner is perpendicular to the rotational axis of the metal work piece, and one wall surface of the corner is parallel to the rotational axis of the metal work piece, and where the two wall surfaces are connected by a surface having the same radius of curvature as the nose cutting edge of the turning insert.

By such a turning tool, the entering angle of the first cutting edge is between 20° and 40°, when axial turning away from the clamping end of the metal work piece, and the inventors have found that such entering angle give reduced wear of the insert. By such a turning tool, the entering angle of the second cutting edge is between 20° and 40°, when out facing, and the inventors have found that such entering angle give reduced wear of the insert.

According to an embodiment, a method to machine a metal work piece is performed using a turning insert according to the invention. The method includes the steps of clamping the metal work piece at a first end, rotating the metal work piece around a rotational axis A3, positioning the first cutting edge of an active nose portion such that the first cutting edge forms a smaller angle relative to the rotational axis A3 of the metal work piece than the angle formed by the second cutting edge relative to the rotational axis of the metal work piece, and moving the turning insert in a direction perpendicular to and away from the rotational axis A3 such that the second cutting edge is active.

An active nose portion is the nose portion which is positioned such that during cutting, this nose portion includes at least one cutting edge which cuts chips from the metal work piece. The active nose portion is positioned closer to the rotational axis of the metal work piece and closer to the first end of the metal work piece than the other, i.e. inactive, nose portions.

The expression "the second cutting edge is active" means that the second cutting edge cuts chips from the metal work piece. Further, a portion of the nose cutting edge adjacent to the active second cutting edge is active. The first cutting edge, formed on or at the same nose portion as the second cutting edge, is inactive simultaneously as the second cutting edge is active.

The moving of the turning insert is commonly known as feeding, alternatively out-facing. The second cutting edge is preferably active at a second entering angle κ2 of 20-40°. If the entering is less than 20°, the width of the chips would be too wide resulting in reduced chip control, and the risk of vibration would increase. If the entering angle is over 40°, the insert wear would increase.

According to an embodiment, a method to machine a metal work piece is performed using a turning insert according to the invention. The method includes the steps of clamping the metal work piece at a first end, rotating the metal work piece around a rotational axis, positioning the first cutting edge of an active nose portion such that the first cutting edge forms a smaller angle relative to the rotational axis A3 of the metal work piece than the angle formed by the second cutting edge relative to the rotational axis of the metal work piece, and moving the turning insert in a direction parallel to the rotational axis A3 and away from the first end such that the first cutting edge is active.

An active nose portion is the nose portion which is positioned such that during cutting, this nose portion includes at least one cutting edge which cuts chips from the metal work piece. The active nose portion is positioned closer to the rotational axis of the metal work piece and closer to the first end of the metal work piece than the other, i.e. inactive, nose portions. The expression "the first cutting edge is active" means that the first cutting edge cuts chips from the metal work piece. Further, a portion of the nose cutting edge adjacent to the active first cutting edge is active.

The second cutting edge, formed on or at the same nose portion as the first cutting edge, is inactive simultaneously as the first cutting edge is active. The moving of the turning insert is a longitudinal turning operation. The first cutting edge is preferably active at a first entering angle κ1 of 20-40°. If the entering is less than 20°, the width of the chips would be too wide resulting in reduced chip control, and the risk of vibration would increase. If the entering angle is over 40°, the insert wear would increase.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 19A is a perspective view showing a turning insert according to a third embodiment.

FIG. 19B is a side view of the turning insert in FIG. 19A.

FIG. 19C is a top view of the turning insert in FIG. 19A.

FIG. 19D is a magnified view of the bottom right portion of the turning insert in FIG. 19A.

All turning insert figures have been drawn to scale.

DETAILED DESCRIPTION

Figure 1:
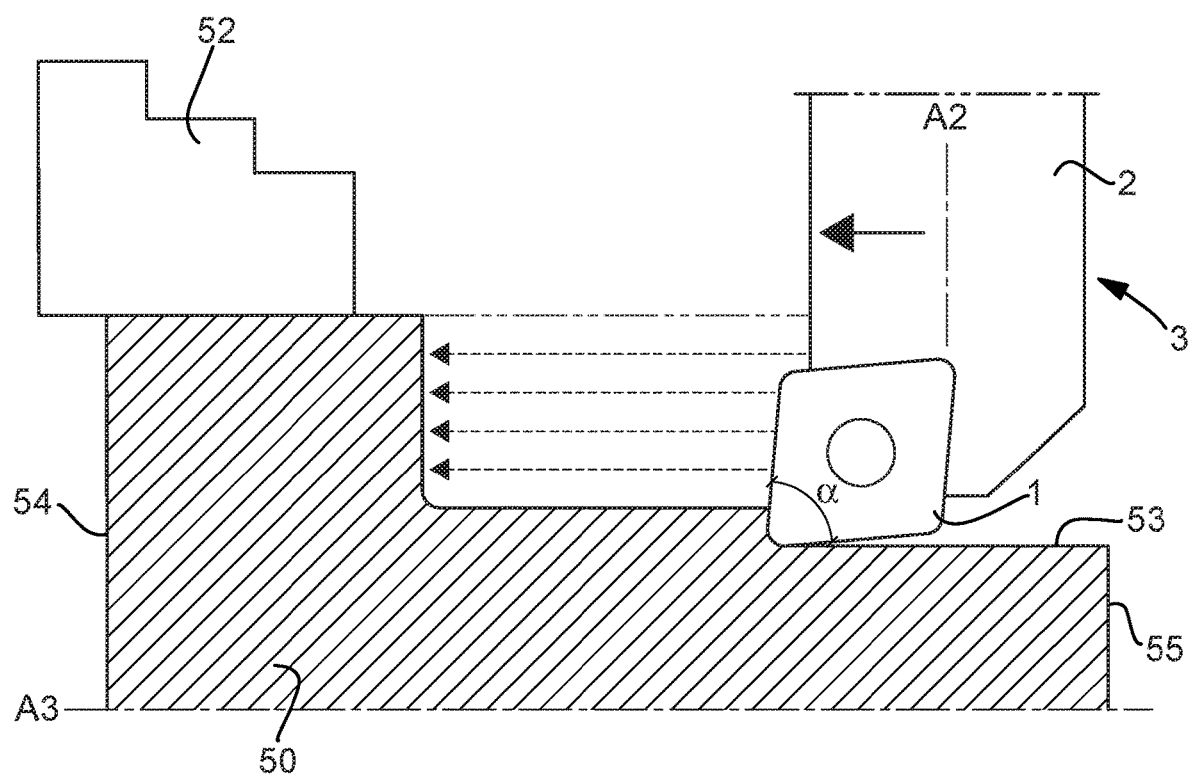
FIG. 1 is a schematic view showing conventional turning of a cylindrical surface with a conventional turning insert.

Reference is made to FIG. 1, which show a conventional metal cutting operation by turning using a conventional turning insert 1. A metal work piece 50 is clamped by clamping jaws 52, which are connected to a machine including a motor (not shown), such as a CNC-machine or a turning lathe. The clamping jaws press against an external surface at a first end 54, or clamping end, of the metal work piece 50. An opposite second end 55 of the metal work piece 50 is a free end. The metal work piece 50 rotates around a rotational axis A3.

The turning insert 1 is securely and removably clamped in an insert seat or a pocket in a tool body 2. The tool body 2 has a longitudinal axis A2, extending from a rear end to a front end, in which the insert seat or pocket is located. The tool body 2 and the turning insert 1 together form a turning tool 3. The turning tool 3 is moved in relation to the metal work piece 50, commonly designated feed.

In FIG. 1, the feed is axial, also called longitudinal feed, i.e. the direction of the feed is parallel to the rotational axis A3. In this way, a cylindrical surface 53 is formed. The turning insert 1 has an active nose with a nose angle α which is 80°, defined as the angle between the main cutting edge and the secondary cutting edge. As the turning insert 1 reaches closer to the wall surface which is perpendicular to the rotational axis A3, chip control is poor because there is not much space for the chips to get out from the cutting zone. There is also risk that chips hits or damages the machined surface.

The main cutting edge is behind the nose cutting edge. In other words, the entering angle for the main cutting edge is over 90°, in FIG. 1 around 95°. The entering angle is defined as the angle between the cutting edge and the feed direction. In the turning method shown in FIG. 1, the back clearance angle is around 5°. The back clearance angle is defined as the angle between the secondary cutting edge, which is a trailing edge, and a direction which is opposite, i.e. 180° in relation, to the feed direction.

Figure 2:
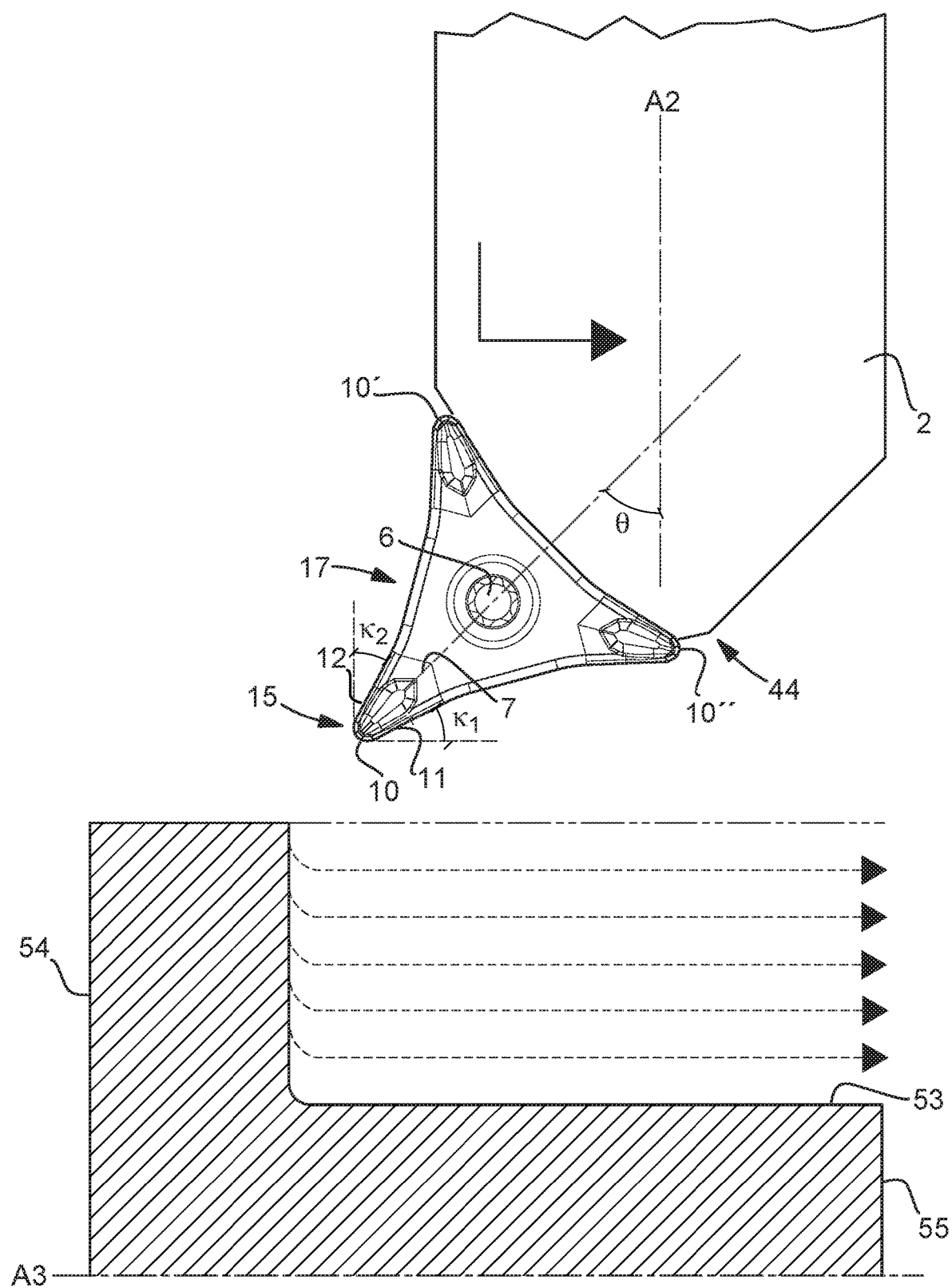
FIG. 2 is a schematic view illustrating turning of a cylindrical surface by a turning insert according to a first embodiment.

Reference is made to FIG. 2, which show a turning operation, using a turning tool including a turning insert according to a first embodiment. As in FIG. 1, a metal work piece is clamped by clamping jaws (not shown), which are pressed against an external surface at or adjacent to a first end 54 of the metal work piece. An opposite second end 55 of the metal work piece is a free end. The metal work piece rotates around a rotational axis A3. The turning insert, seen in top view, is securely and removably clamped in an insert seat or a pocket in tool body 2 by means of a screw 6.

The tool body 2 has a longitudinal axis A2, extending between a rear end and a front end 44, in which the insert seat or pocket is located. In FIG. 2, the feed is, to a greatest extent, axial, also called longitudinal feed, i.e. the direction of the feed is parallel to the rotational axis A3. In this way, an external cylindrical surface 53 is formed. At the entry of each cut, or immediately prior to the axial feed, the feed has a radial component, in such a way that the turning insert move along an arc of a circle.

The turning insert includes an active nose portion 15, including an active nose cutting edge 10. The active nose portion 15 further includes an active first cutting edge which during axial turning parallel to the rotational axis A3 has an entering angle κ1 which is chosen to be in the range of 10-45°, for example, 20-40°. The first cutting edge, which is the main cutting edge in the operation, is ahead of the nose cutting edge 10 in the axial feed direction. In other words, the first cutting edge is a leading edge.

A second cutting edge, formed on or at the active nose portion 15, is a secondary cutting edge or a trailing edge. If the feed direction would be radial, in such a way that the feed direction would be perpendicular to and away from the rotational axis A3, the second cutting edge would be active at an entering angle κ2. A bisector 7 is defined by the first and second cutting edges. In other words, the bisector is formed between the first and second cutting edges. The first and second cutting edges converge at a point outside the turning insert. The bisector of the active nose portion 15 forms an angle θ of 40-50°, relative to the longitudinal axis A2.

The turning insert includes two inactive nose portions, including two inactive nose cutting edges 10', 10". In the axial turning operation, all parts of the turning insert is ahead of the active nose cutting edge 10 in the feed direction. In the axial turning operation, chips can be directed away from the metal work piece in a trouble-free manner.

In the machining step the turning insert 1 enters into the metal work piece 50 such that the nose cutting edge 10 moves along an arc of a circle. The turning insert 1 enters into the metal work piece 50, or goes into cut, such that the chip thickness during entry is constant or substantially constant. At the entry, the depth of cut is increased from zero depth of cut. Such preferred entry reduces the insert wear, especially the wear at the nose cutting edge 10.

Chip thickness is defined as feed rate multiplied by entering angle. Thus, by choosing and/or varying the feed rate and the movement and/or direction of the turning insert during entry, the chip thickness can be constant or substantially constant. The feed rate during entry is preferably less than or equal than 0.50 mm/revolution. The chip thickness during entry is preferably less than or equal to the chip thickness during subsequent cutting or machining.

The cylindrical surface 53, or rational symmetrical surface, generated or formed at least partly by the nose cutting edge in FIGS. 1 and 2, has a wavy shape with small peaks and valleys, and the wavy shape is influenced at least partly by the curvature of the nose radius and the feed rate. The wave height is less than 0.10 mm, for example, less than 0.05 mm. A thread profile is not a cylindrical surface 53 in this sense.

Figure 3:
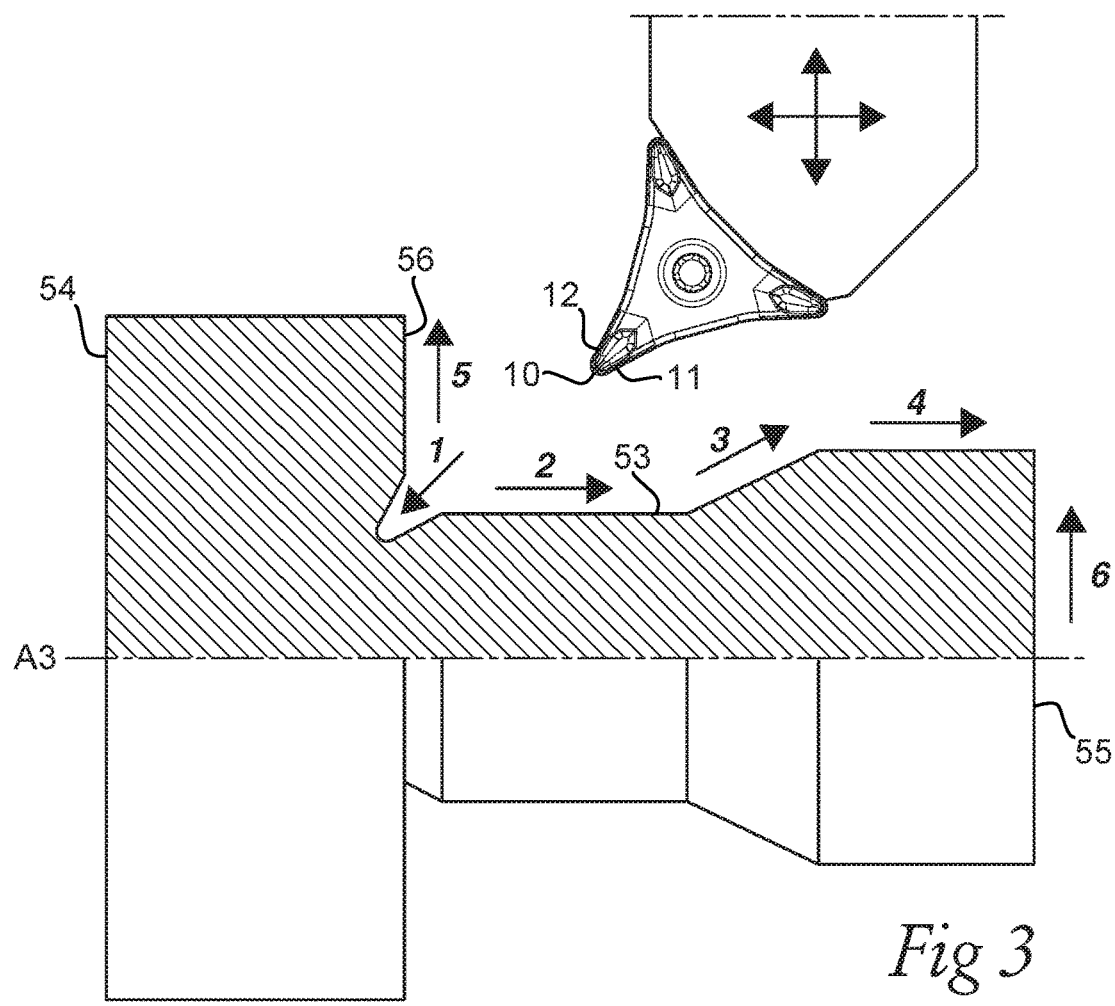
FIG. 3 is a schematic view illustrating turning, including axial turning and out-facing, of a metal work piece with a turning insert according to a first embodiment.
Figure 4:
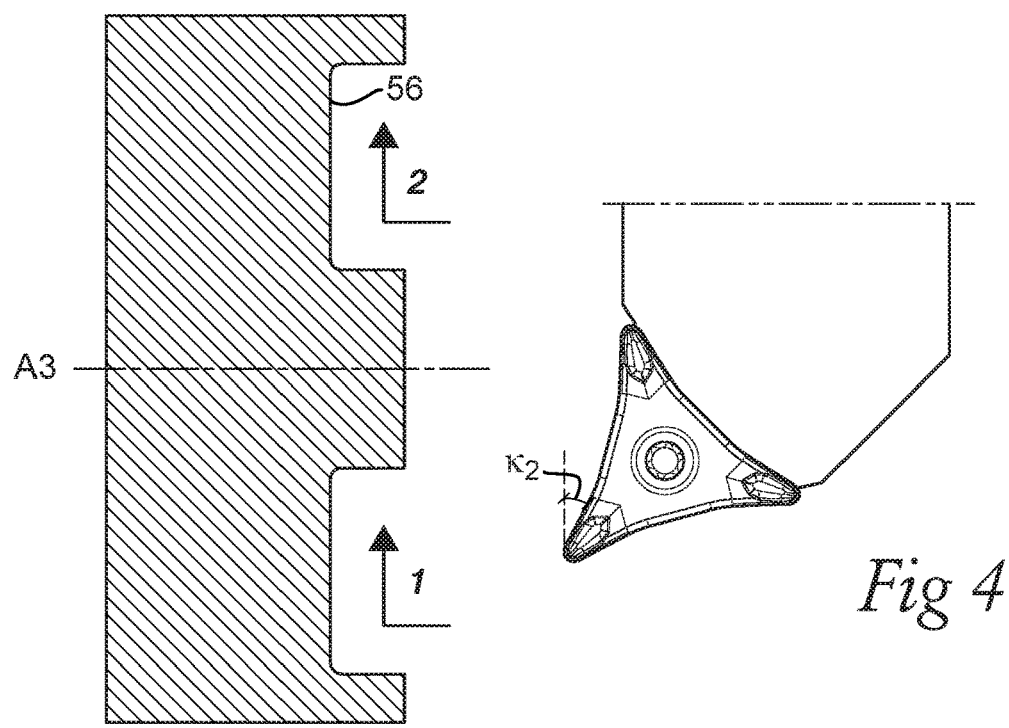
FIG. 4 is a schematic view illustrating turning, including out-facing, of a metal work piece with a turning insert according to a first embodiment.

In FIGS. 3 and 4, the turning insert and tool body in FIG. 2 can be seen in alternative machining operations, showing the versatile application area of the turning tool, especially with regard to feed direction. FIG. 3 shows a machining sequence in six steps. Step 1 is a undercutting operation. Step 2 is axial turning away from the first end 54 or clamping end of the metal work piece. Step 3 is a profiling operation in the form of a feed which has both an axial and a radial component, generating a conical or frustoconical, i.e. tapered, surface. Step 4 is an operation similar to operation 2. Step 5 is an out-facing operation generation a flat surface located in a plane perpendicular to the rotational axis A3 of the metal work piece. Step 6 is an out-facing operation at the second end 55 or free end of the metal work piece.

FIG. 4 shows two machining steps, step 1 and step 2. In step 1, the radial feed is perpendicular to and towards the rotational axis A3. In 2, the radial feed is perpendicular to and away from the rotational axis A3, wherein a flat surface 56 perpendicular to the rotational axis A3 is generated. In both cases, the second cutting edge is active at an entering angle κ2 which is in the range of 10-45°, preferably 20-40°. The direction of rotational of the metal work piece around the rotational axis A3 is in opposite directions for step 1 and 2. In step 2, the direction of rotation is the same as in FIG. 1-3.

Figure 5:
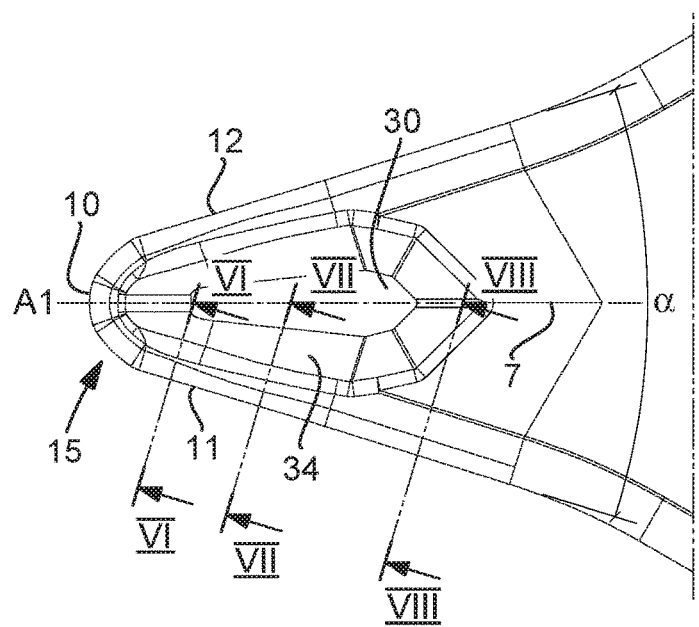
FIG. 5 is a top view of a top surface of a nose portion of a turning insert according to a first embodiment.

FIG. 5 shows a top view of a nose portion 15 of a turning insert according to a first embodiment, including a first 11 and a second 12 cutting edge connected by a convex nose cutting edge 10. The first 11 and second 12 cutting edges on or at the same nose portion 15 forms a nose angle α of 25-50° relative to each other, and the first 11 and second 12 cutting edges converge at a point (not shown) outside of the turning insert. A bisector 7 is located between, and at equal distances from, the first 11 and second 12 cutting edges. The bisector 7 intersects the nose cutting edge 10 at the center thereof.

A protrusion 30 is formed in the top surface of the turning insert, which protrusion has the major extension thereof along the bisector. The protrusion includes a first chip breaker wall 34 facing towards the first cutting edge, and a second chip breaker wall facing the second cutting edge. The distance, measured in a direction perpendicular to the first cutting edge 11, and in a plane parallel to a reference plane RP, from the first cutting edge 11 to the first chip breaker wall 34 is increasing away from the nose cutting edge 10. This gives improved chip control especially in a turning operation as in FIG. 2. The protrusion 30, and thus the first chip breaker wall 34, has a shorter extension than the first cutting edge 11.

Figure 9:
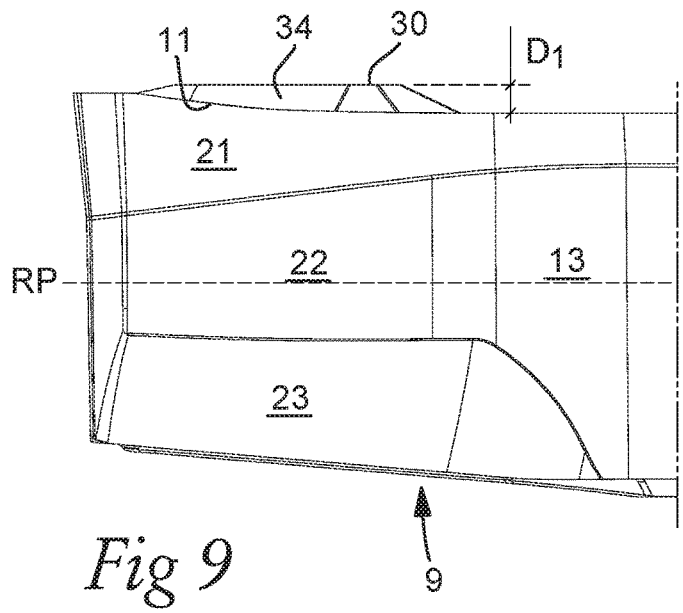
FIG. 9 is a side view of the nose portion in FIG. 5.

FIG. 9 shows a side view of the nose portion in FIG. 5. A bottom surface 9 is located opposite a top surface. The reference plane RP is located between and at equidistant length from the top and bottom 9 surfaces. Although the top and bottom surfaces are not flat, the reference plane RP can be positioned such that it is parallel to a plane intersecting the three nose cutting edges.

A side surface 13 connects the top surface and the bottom surface 9. The side surface 13 includes a first clearance surface 21 adjacent to the first cutting edge 11, a third clearance surface 23 adjacent to the bottom surface 9, and a second clearance surface 22 located between the first clearance surface 21 and the third clearance surface 23. The distance from the first cutting edge 11 to lower border line of the first clearance surface 21, i.e. the border line of the first clearance surface 21 located closest to the bottom surface 9, is decreasing away from the nose cutting edge. The height, in a direction perpendicular to the reference plane RP, of the first clearance surface 21 is less than the height of the second clearance surface 22, in order to further increase the strength of the first cutting edge 11. The height of the first clearance surface 21 is at least 0.3 mm in order to compensate for flank wear of the first cutting edge 11. The first cutting edge 11 slopes towards the bottom surface 9 and the reference plane RP slopes away from the nose cutting edge 10. The distance from the first cutting edge 11 to the reference plane RP varies in such a way that that this distance is decreasing as the distance from the nose cutting edge 10 increase, at least for a portion of the first cutting edge 11. A distance from the reference plane RP to a first portion of the first cutting edge 11, located adjacent to the nose cutting edge 10, is greater than a distance from the reference plane RP to a second portion of the first cutting edge 11, located further away from the nose cutting edge 10. By such orientation of the first cutting edge 11, the chip control is improved in axial turning away from the clamping end, as e.g. in an operation as seen in FIG. 2. A distance D1 is measured in a direction perpendicular to the reference plane RP, representing the distance between the top surface of the protrusion 30 and the lowest point of the first cutting edge 11. D1 is 0.28-0.35 mm. By this, the chip breaking and/or chip control is further improved, in an operation as seen in FIG. 2.

Figure 6:
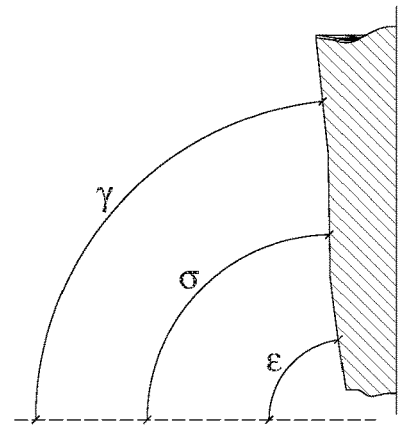
FIGS. 6-8 are detailed sections along the lines VI-VI, VII-VII and VIII-VIII, respectively, in FIG. 5.
Figure 7:
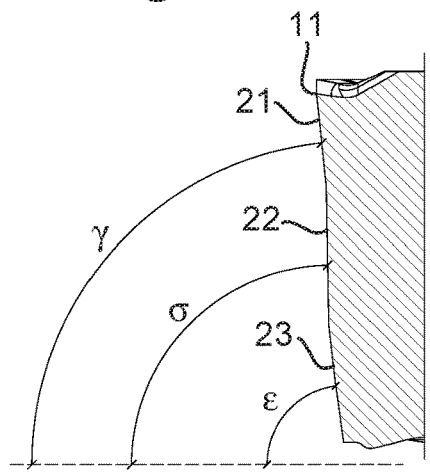
Figure 8:
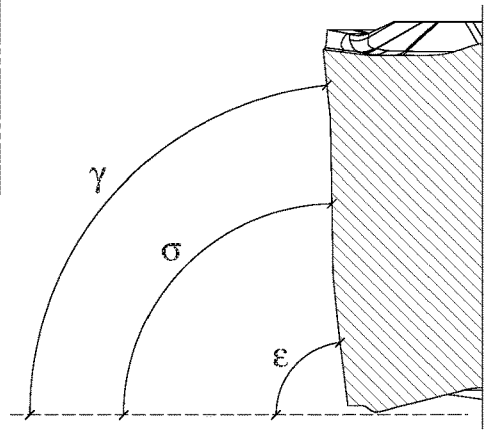

FIGS. 6-8 show cross-sectional views taken along lines VI-VI, VII-VII and VIII-VIII, respectively, in FIG. 5. The cross-sections are perpendicular to the first cutting edge 11 in planes perpendicular to the reference plane RP. In FIGS. 6-8, the angles which the first, second and third clearance surfaces 21, 22, 23 form in relation to a plane parallel to the reference plane RP and intersecting the bottom surface 9 are designated γ, σ and ε, respectively. Angle α is greater than angle ε. By this, out-facing can be made from a smaller work piece diameter with a reduced decrease in insert strength. Greater clearance angle is necessary at smaller diameters, but a great and constant clearance angle would give a reduced strength of the insert.

The second clearance surface 22 has the purpose of increasing the strength of the insert. The third clearance surface 23 is adjacent to the bottom surface. Angle γ is greater than angle ε. Angle σ is greater than γ. The third clearance surface 23 is convex or substantially convex, seen in cross section as in FIGS. 6-8, in order to further improve the lower diameter range, i.e. the minimum diameter where the turning insert can function in an out facing operation, while minimizing the reduction of insert strength.

The configuration of second cutting edge 12, and the side surface 13 adjacent to the second cutting edge 12 are in accordance with the configuration of the first cutting edge 11, and the side surface 13 adjacent to the first cutting edge 11, which has been described in relation to FIGS. 5-8 above.

Figure 11:
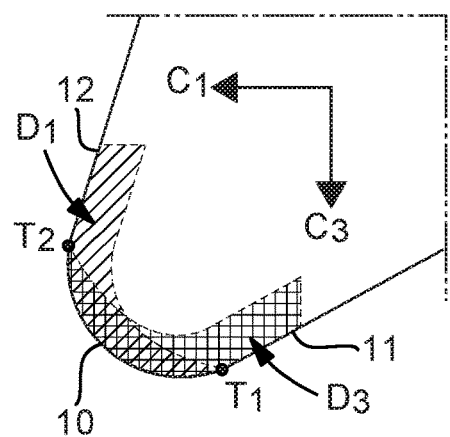
FIG. 11 is a schematic top view of a nose portion of a conventional turning insert, showing wear from conventional turning.

FIG. 11 shows the principle of conventional turning, where C1 represents the feed direction in FIG. 1, and D1 represents the wear on or at a nose portion from such operation. C3 represents a conventional facing operation, i.e. feed perpendicular and towards the rotational axis A3, and D3 represents the wear on or at a nose portion from such operation. The second cutting edge 12 is the main cutting edge in C1 feed direction. The first cutting edge 11 is the main cutting edge in C3 feed direction. A convex nose cutting edge 10 connects the first and second cutting edges 11, 12. Transition points T1, T2 represent the transition between the nose cutting edge 10 and the first 11 and second 12 cutting edge, respectively. The wear D1, D3, is dependent on both the depth of cut and the feed rate. However, it is clear that D1 and D3 overlap, resulting in high wear at the nose cutting edge 10, or at least at a center portion of the nose cutting edge 10.

Figure 12:
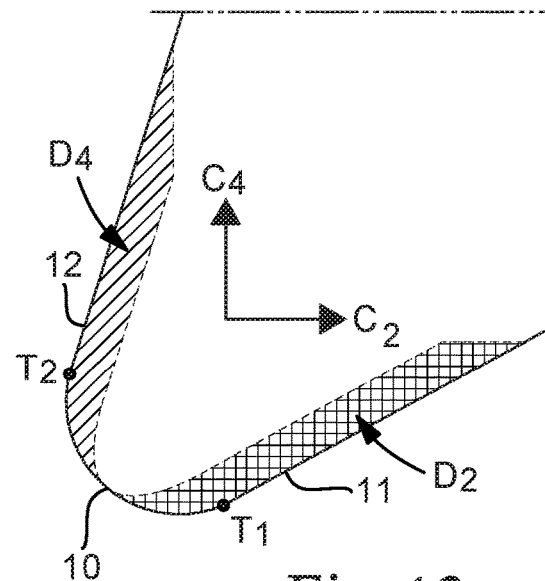
FIG. 12 is a schematic top view of a nose portion of an embodiment, showing wear from turning in FIG. 10.

FIG. 12 shows the principle of an alternative turning method. C2 represents the main feed direction in FIG. 2, or the main feed direction in pass 2, 4, 6 and 8 in FIG. 10, i.e. an axial feed direction away from the clamping end of the metal work piece. D2 represents the wear on or at a nose portion from such operation. C4 represents an out-facing operation, i.e. feed perpendicular to and away from the rotational axis A3, as seen in the main feed directions in pass 1, 3, 5 and 7 in FIG. 10. D4 represents the wear on or at a nose portion from such operation. The second cutting edge 12 is the main cutting edge in C4 feed direction. The first cutting edge 11 is the main cutting edge in C2 feed direction. A convex nose cutting edge 10 connects the first and second cutting edges 11, 12.

Transition points T1, T2 represent the transition between the nose cutting edge 10 and the first 11 and second 12 cutting edge, respectively. The wear D2, D4, is dependent on both the depth of cut and the feed rate. However, it is clear that D2 and D4 do not overlap, or at least overlap to a lesser degree than in FIG. 11, resulting in reduced wear at the nose cutting edge 10, or at least reduced wear at a center portion of the nose cutting edge 10. The wear of the first and second cutting edges 11, 12 has a wider range, i.e. is distributed over a longer distance, compared to FIG. 11. However, because the smaller entering angles in feed C2 and C4 compared to the greater entering angles in C1 and C3, the chip thickness in FIG. 12 will be thinner and therefor give relatively small wear. At constant feed rate and depth of cut, the area of D2 is equal to the area of D3, and the area of D1 is equal to the area of D4.

Figure 10:
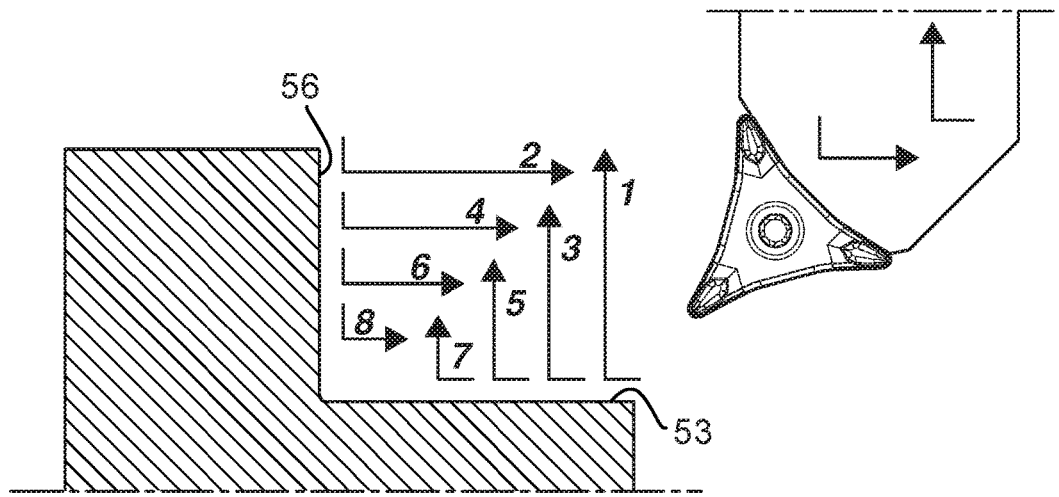
FIG. 10 is a schematic view illustrating turning of a 90° corner by a turning insert according to a first embodiment.
Figure 13A:
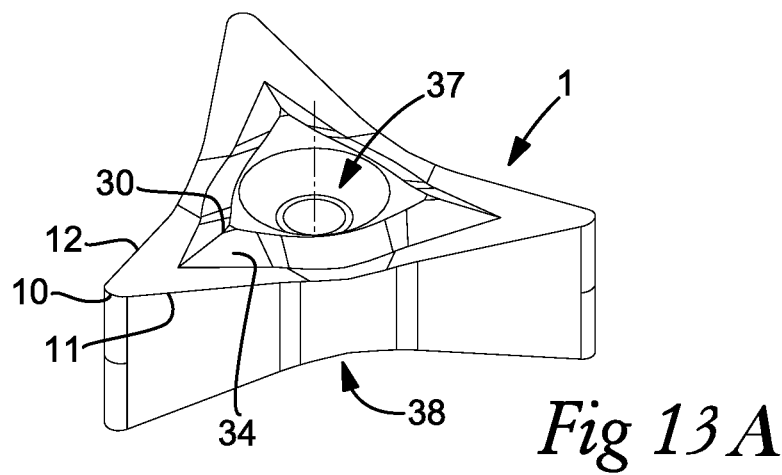
FIG. 13A is a perspective view showing a turning insert according to a second embodiment.
Figure 13B:
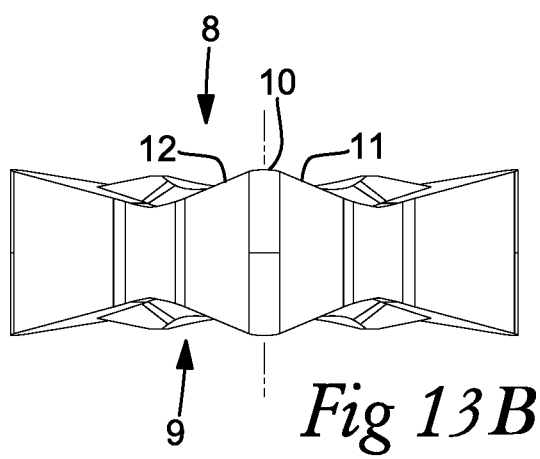
FIG. 13B is a front view of the turning insert in FIG. 13A.
Figure 13C:
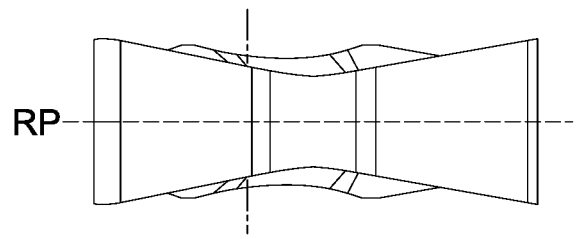
FIG. 13C is a side of the turning insert in FIG. 13A.
Figure 13D:
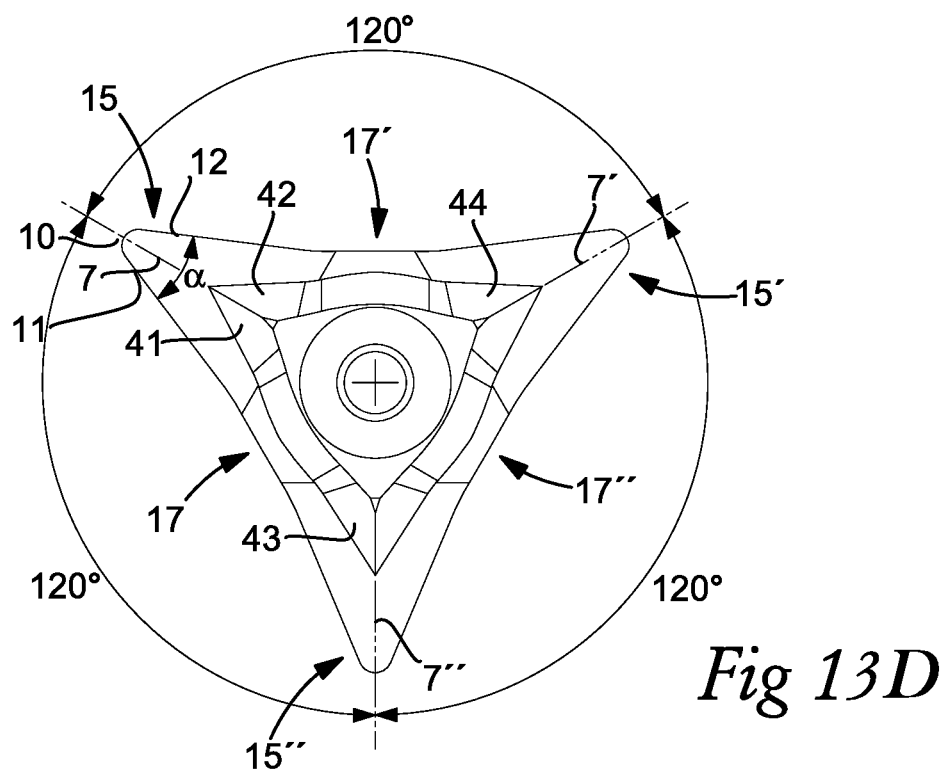
FIG. 13D is a top view of the turning insert in FIG. 13A.

FIG. 10 show an example of a machining sequence using a turning insert according to the first embodiment. Left-hand side is the clamping end of the metal work piece. A 90° corner including a cylindrical surface 53 and a flat surface 56 is formed by turning. A sequence of steps 1-8 is shown. The entry for each step is shown as perpendicular to the main feed direction of each step. The main feed direction in steps 1, 3, 5 and 7 is perpendicular to and away from the rotational axis A3. The main feed direction in steps 2, 4, 6 and 8 is parallel to the rotational axis A3 and away from the clamping end. The entry for each cut is preferably as described in connection to FIG. 2. The wear of the turning insert 1 after the sequence of steps showed in FIG. 10 is similar or identical to the wear shown in FIG. 12.

FIGS. 16A-18B further describes the turning insert 1 according to the first embodiment, as well as a turning tool 3 which includes the turning insert 1 and a tool body 2. The turning insert 1 includes a top surface 8, which is or includes a rake face, and an opposite bottom surface 9, functioning as a seating surface. A reference plane RP is located parallel to and between the top surface 8 and the bottom surface 9. A center axis A1 extends perpendicular to the reference plane RP and intersects the reference plane RP, the top surface 8 and the bottom surface 9. A hole, for a screw, having openings in the top surface 8 and the bottom surface 9 is concentric with the center axis A1. The turning insert 1 includes side surfaces 13, 13', 13", functioning as clearance surfaces, connecting the top surface 8 and the bottom surface 9.

Three nose portions 15, 15', 15" are formed symmetrically relative to or around the center axis A1. The nose portions 15, 15', 15" are identical. Each nose portion 15, 15', 15" includes a first cutting edge 11, a second cutting edge 12 and a convex nose cutting edge 10 connecting the first 11 and second 12 cutting edges. The nose cutting edges 10, 10', 10" are located at a largest distance from the center axis A1, i.e. at a larger distance from the center axis A1 than all other parts of the turning insert. In a top view, seen in FIG. 16D, the first 11 and second 12 cutting edges on or at the same nose portion 15 forms a nose angle α of 25-50° relative to each other, in FIG. 16D the nose angle α is 35°.

Figure 16A:
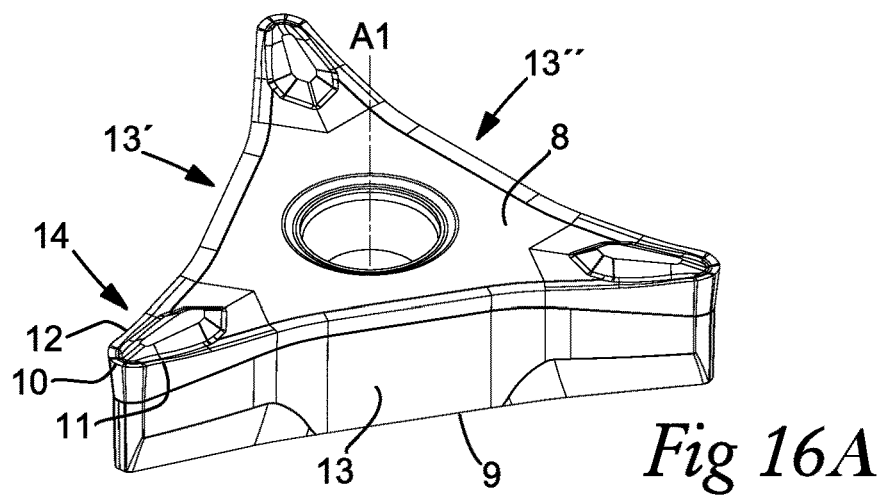
FIG. 16A is a perspective view showing a turning insert according to a first embodiment.
Figure 16B:
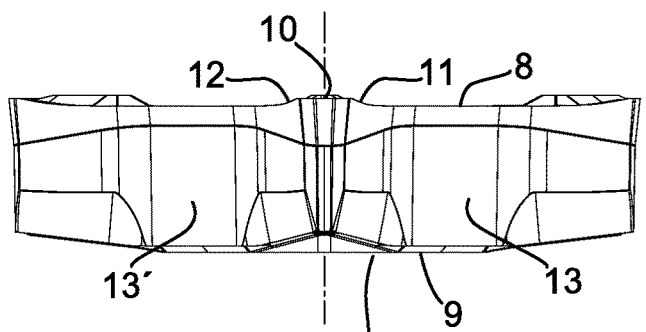
FIG. 16B is a front view of the turning insert in FIG. 16A.
Figure 16C:
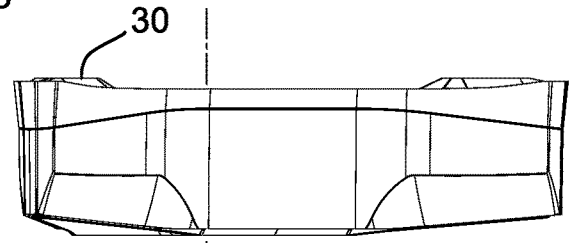
FIG. 16C is a side view of the turning insert in FIG. 16A.
Figure 16D:
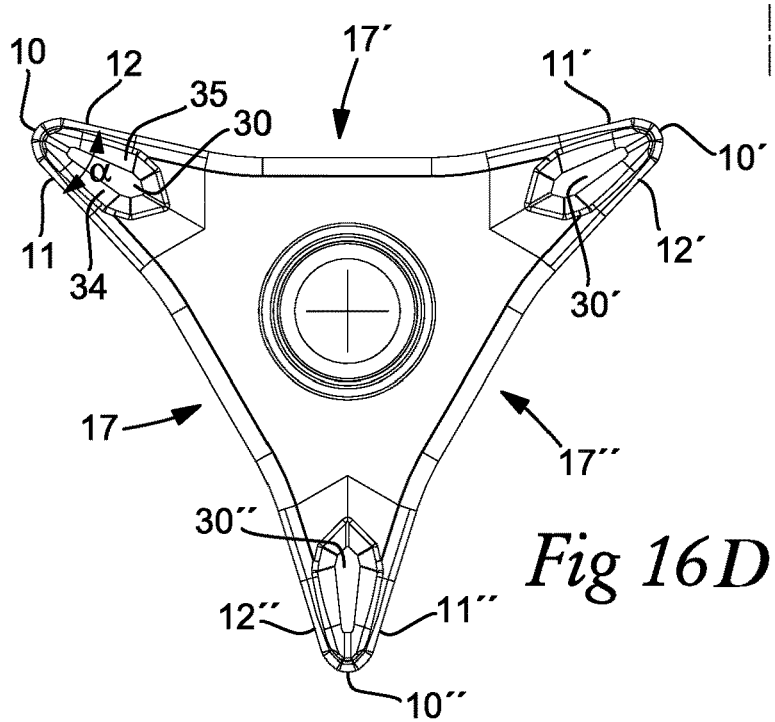
FIG. 16D is a top view of the turning insert in FIG. 16A.

In a side view, such as in FIG. 16B, at least a portion of the first and second cutting edges 11, 12 on or at each nose portion 15, 15', 15" slopes towards the bottom surface, such that in a side view, the first and second cutting edges 11, 12 have the highest points thereof bordering to the nose cutting edge 10 on or at the same nose portion 15. In other words, the distance from the first cutting edge 11 and the second cutting edge 12 to the reference plane RP varies in such a way that that this distance is decreasing at increasing distance from the nose cutting edge 10. The first and second cutting edges 11, 12 are linear or straight, or substantially linear or straight in a top view.

Bisectors 7, 7', 7" extend equidistantly from each pair of first 11, 11', 11" and second 12, 12', 12" cutting edges. Each bisector 7, 7', 7" intersects the center axis A1. Indentations 17, 17', 17" are formed between each pair of nose cutting edges 10, 10', 10". The bottom surface 9, seen in FIGS. 18A and 18B, includes rotation prevention means, with the purpose of reducing the tendency for the turning insert 1 to rotate around the center axis A1 during cutting, in the form of three grooves 40, 40', 40", each groove 40, 40', 40" having a main extension in the same direction as the bisector 7, 7', 7" located adjacent the closest first 11 and second 12 cutting edges. Each groove 40, 40', 40" includes two seating surfaces preferably at an obtuse angle, 100-160°, in relation to each other.

Figure 17:
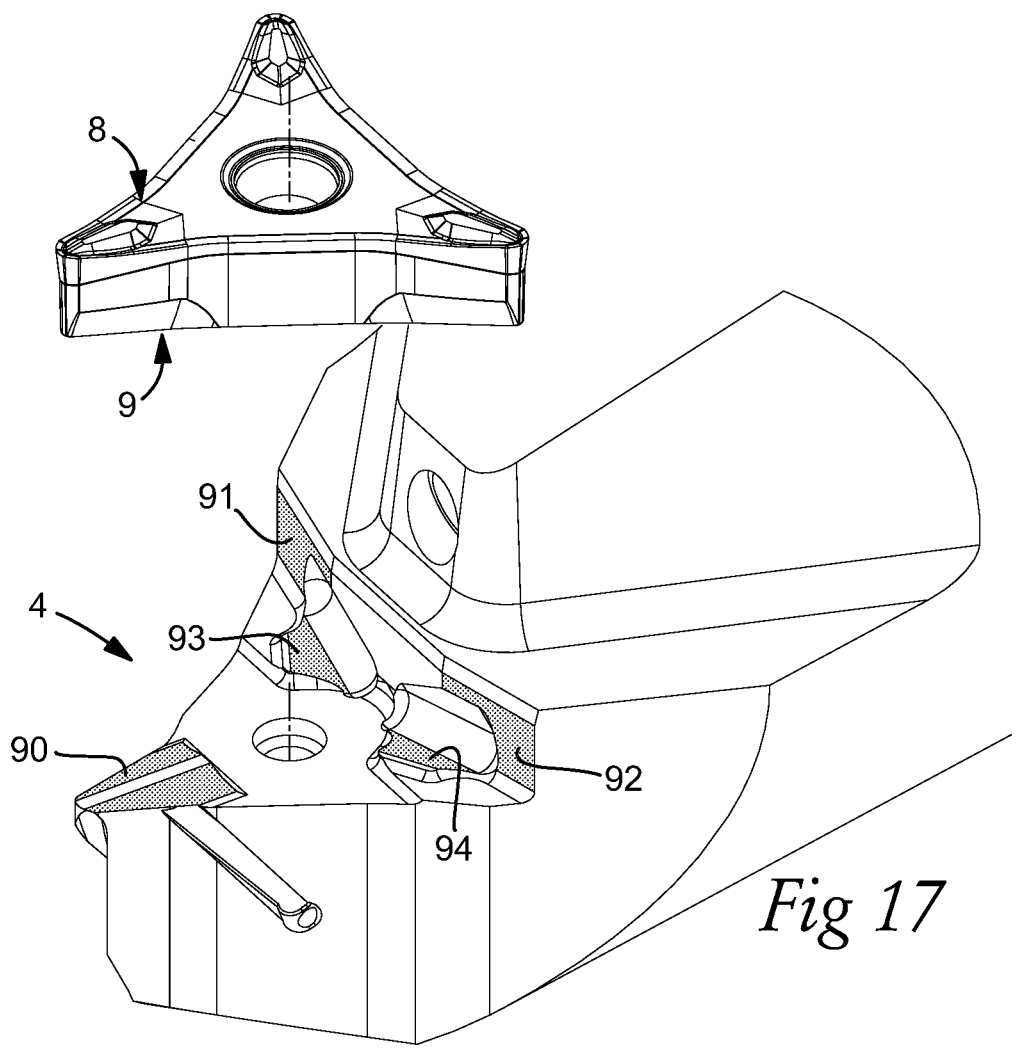
FIG. 17 is a perspective view showing the turning insert in FIG. 16A and a tool body.
Figure 18A:
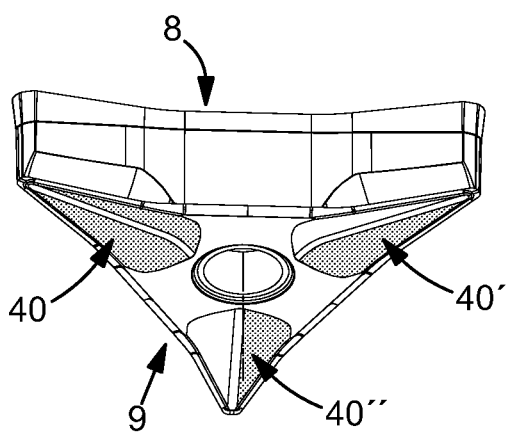
FIG. 18A is a perspective view showing the bottom surface of the turning insert in FIG. 16A.
Figure 18B:
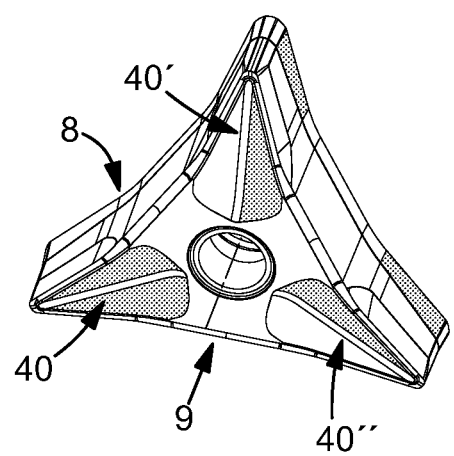
FIG. 18B is a further perspective view showing the bottom surface of the turning insert in FIG. 16A.

The turning insert 1 is intended to be securely clamped, by clamping means such as a screw or a top clamp, in an insert seat 4 located at a front end of a tool body 2, as seen in FIG. 17. The contact between the insert seat 4 and the turning insert will now be described, see the shaded areas in FIG. 18B and FIG. 17. The active nose cutting portion 15 is the part of the insert where groove 40 is located in FIG. 18B. The two seating surfaces of groove 40 are in contact with two surfaces of a ridge 90 in the bottom of the insert seat 4. One surface of each other groove 40', 40", the surfaces located at the largest distance from the active nose cutting edge 10, are in contact with bottom surfaces 93, 94 in the bottom of the insert seat 4. At least portions of the side surface 13 located at the greatest distance from the active nose cutting edge 10 may be in contact with rear seating surfaces 91, 92 formed at a rear end of the insert seat 4.

FIGS. 13A-15 show a turning insert 1 according to a second embodiment as well as a turning tool 3 which includes the turning insert 1 and a tool body 2. The turning insert 1 includes a top surface 8, which is or includes a rake face, and an opposite bottom surface 9, functioning as a seating surface. The top 8 and bottom 9 surfaces are identical. This means that while in a first position, the top surface 8 functions as a rake surface, when the insert is turned upside down, the same surface is now functioning as a seating surface. A reference plane RP is located parallel to and between the top surface 8 and the bottom surface 9. A center axis A1 extends perpendicular to the reference plane RP and intersects the reference plane RP, the top surface 8 and the bottom surface 9. A hole, for a screw, having openings in the top surface 8 and the bottom surface 9 is concentric with the center axis A1. The turning insert 1 includes side surfaces 13, 13', 13", functioning as clearance surfaces, connecting the top surface 8 and the bottom surface 9. Three nose portions 15, 15', 15" are formed symmetrically relative to or around the center axis A1.

The nose portions 15, 15', 15" are identical. Each nose portion 15, 15', 15" includes a first cutting edge 11, a second cutting edge 12 and a convex nose cutting edge 10 connecting the first 11 and second 12 cutting edges. The nose cutting edges 10, 10', 10" are located at a largest distance from the center axis A1, i.e. at a larger distance from the center axis A1 than all other parts of the turning insert. In a top view, seen in FIG. 13D, the first 11 and second 12 cutting edges on or at the same nose portion 15 forms a nose angle α of 25-50° relative to each other, in this case 45°. In a side view, such as in FIG. 13B, at least a portion of the first and second cutting edges 11, 12 on or at each nose portion 15, 15', 15" slopes towards the bottom surface, such that in a side view, the first and second cutting edges 11, 12 has the highest points thereof adjacent to the nose cutting edge 10 on or at the same nose portion 15. In other words, the distance from the first cutting edge 11 and the second cutting edge 12 to the reference plane RP varies in such a way that that this distance decreases as the distance increases from the nose cutting edge 10.

The first and second cutting edges 11, 12 are linear or straight, or substantially linear or straight in a top view. Bisectors 7, 7', 7" extend equidistantly from each pair of first 11, 11', 11" and second 12, 12', 12" cutting edges. Each bisector 7, 7', 7" intersects the center axis A1. Indentations 17, 17', 17" are formed between each pair of adjacent nose cutting edges 10, 10', 10".

The turning insert 1 includes rotation prevention means in the form of a set of surfaces 41, 42, 43, 44, where each surface 41, 42, 43, 44 extends in a plane which forms an angle of 5-60° in relation to the reference plane RP. The set of surfaces 41, 42, 43, 44 are formed at a central ring-shaped protrusion 30, extending around the center axis A1. By such a configuration, the turning insert 1 can be made double-sided or reversible, giving an increased possible usage. The first chip breaker wall 34 can be a part of the set of surfaces 41, 42, 43, 44. An alternative solution (not shown) is to arrange the first chip breaking wall 34 as part of a further protrusion (not shown) at a greater distance from the center axis A1.

Figure 14:
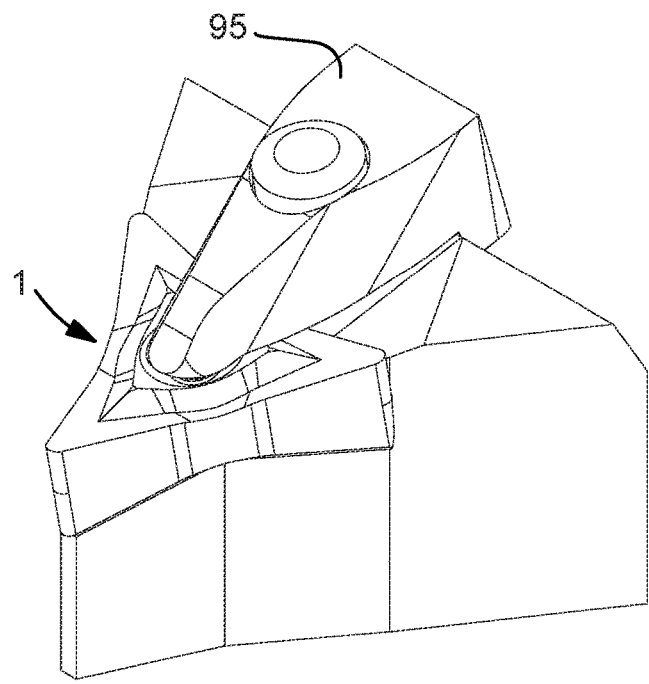
FIG. 14 is a perspective view showing the turning insert in FIG. 13A positioned in a partial tool body.
Figure 15:
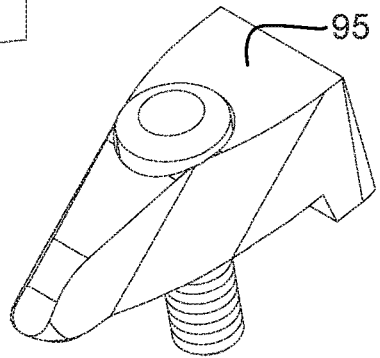
FIG. 15 is an exploded view showing the turning insert and tool body in FIG. 14.
Figure 15:
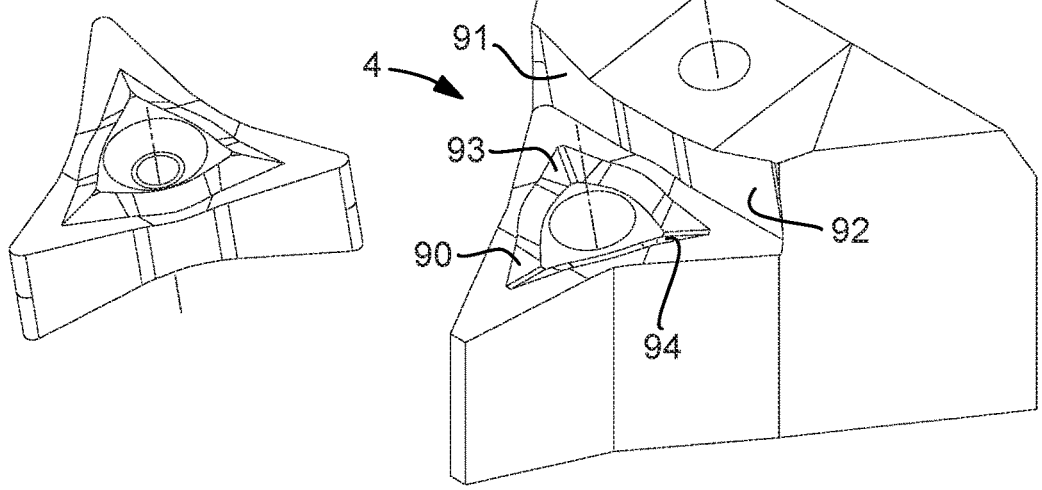

FIG. 14 show one possible clamping mode of the turning insert 1 by means of a clamp 95, which presses the insert and keeps the insert in the insert seat 4 of the tool body 2. FIG. 15 show the insert seat 4, in which the turning insert 1 according to the second embodiment can be mounted by means of e.g. a top clamp 95. The side surface 13 located at a greatest distance from the active nose cutting edge 10 includes two surfaces, which are pressed against rear surfaces 91, 92 of the insert seat 4. The set of surfaces 41, 42, 43, 44 includes two front surfaces 41, 42, which are in contact with surfaces of a front portion 90 of the bottom of the insert seat 4. Front in this context is between the center axis A1 and the active nose cutting edge 10. The set of surfaces 41, 42, 43, 44 further includes two rear surfaces 43, 44, which are pressed against rear bottom surfaces 93, 94 which are located in the bottom surface of the insert seat 4, between the front portion 90 and the rear surfaces 91, 92 of the insert seat 4.

FIGS. 19A-19D show a turning insert 1 according to a third embodiment, including a top surface 8, which is or includes a rake face, and an opposite bottom surface 9, functioning as a seating surface. The bottom surface 9 includes rotation prevention means (not shown) identical to the first embodiment, as shown in e.g. FIGS. 18A and 18B. The turning insert 1 according to the third embodiment differs from the turning insert according to first embodiment only with respect of the top surface 8. In all other aspects, including the shape and position of the cutting edges and the use and mounting of the turning insert in a tool body, the turning insert according to the third embodiment is identical to and is intended to be used in an identical way as the turning insert according to the first embodiment.

A protrusion 30 is formed in the top surface 8 of the turning insert 1, which protrusion 30 has the major extension thereof along the bisector 7. More precisely, the top surface 8 of each nose portion 15, 15', 15" includes a protrusion 30 extending along each respective bisector 7, 7', 7" in a top view. The protrusion 30 is spaced apart from the nose cutting edge 10. The width of the protrusion 30 is increasing away from the nose cutting edge 10, where the width is measured perpendicular to the bisector 7 in a top view. For the insert 1 according to the third embodiment, the protrusions 30 formed on of each nose portion 15, 15', 15" are connected by means of a, in a top view, circular or ring-shaped protrusion segment, thereby forming a singular protrusion 30. Alternatively, the protrusions 30 formed on of each nose portion 15, 15', 15" may be spaced apart.

As can be seen in FIG. 19D, the protrusion 30 includes a first chip breaker wall 34 facing towards the first cutting edge 11, and a second chip breaker wall facing the second cutting edge 12. The distance, measured in a direction perpendicular to the first cutting edge 11, and in a plane parallel to a reference plane RP, from the first cutting edge 11 to the first chip breaker wall 34 is increasing away from the nose cutting edge 10. This gives improved chip control especially in a turning operation as in FIG. 2. A distance measured in a direction perpendicular to the reference plane RP, representing the distance between the top surface of the protrusion 30 and the lowest point of the first cutting edge 11, is 0.28-0.35 mm. By this, the chip breaking and/or chip control is further improved, in an operation as seen in FIG. 2.

Between the protrusion 30 and the first cutting edge 11 there is formed a plurality of bumps 80, i.e. protrusions. The bumps 80 or protrusions are spaced apart from the first cutting edge 11 by a distance 0.30-0.60 mm, for example, 0.40-0.50 mm, in a top view. A distance, measured in a direction perpendicular to the reference plane RP, between the top surface of the bump 80 and an an associated portion, i.e. a closest portion, of the first cutting edge 11 is 0.04-0.07 mm, for example, 0.05-0.06 mm. Each bump 80 is thus elevated in relation to an associated portion, i.e. a closest portion, of the first cutting edge 11, such that a distance from at least a portion of the top surface of the bump 80 to the reference plane RP is greater than a distance from the reference plane RP to an associated portion, i.e. a closest portion, of the first cutting edge 11. In a corresponding manner, the protrusion 30 is elevated in relation to the bumps 80.

At least one bump 80, preferably a plurality of bumps 80, intersect the first chip breaker wall 34. The number of bumps 80 adjacent to each associated first cutting edge 11 can be 3-10, for example, 4-8. In the third embodiment, as can be seen in FIG. 19D, the number of bumps 80 adjacent to the associated first cutting edge 11 is 6. At least one of the bumps 80, preferably two or more bumps 80, is oval-shaped or substantially oval shaped or elongated in a top view as best seen in FIG. 19C. At least one of the bumps 80, preferably two or more bumps 80, has a main extension in a top view which is perpendicular to or substantially, i.e. within 20°, perpendicular to the first cutting edge 11.

The top surface 8 of each nose portion 15, 15', 15" is formed symmetrical, or mirror imaged, in a top view, with regards to the respective bisector 7, 7', 7". Thus, between the protrusion 30 and the second cutting edge 12 there is formed a further plurality of bumps 80, which further plurality of bumps 80 are arranged in a corresponding manner.

Although the present embodiments have been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A turning insert comprising:
   a top surface;
   an opposite bottom surface including exactly three rotation prevention means arranged to prevent or at least reduce rotation or movement of the turning insert;
   side surfaces connecting the top surface and the bottom surface;
   a reference plane located parallel to and between the top surface and the bottom surface, an area of the top surface being greater than an area of the bottom surface, wherein both the top and bottom areas are axially projected on the reference plane;
   a center axis extending perpendicular to the reference plane and intersecting the reference plane;
   three nose portions formed symmetrically around the center axis, each nose portion including a first cutting edge, a second cutting edge and a convex nose cutting edge connecting the first and second cutting edges, wherein in a top view the first and second cutting edges on a same nose portion form a nose angle of 25-50° relative to each other, wherein the first and second cutting edges are linear or straight in a top view, and wherein a distance from the first cutting edge to the reference plane decreases as a distance from the nose cutting edge increases, the turning insert being single-sided such that the first and second cutting edges are formed only at a border of the top surface; and a bisector extending from the center axis to each of the convex nose cutting edges of the nose portions and equidistantly between each of the first and second cutting edges, the top surface including a protrusion having an extension along the bisector, and the protrusion having a first chip breaker wall facing the first cutting edge and a second chip breaker wall facing the second cutting edge, the exactly three rotation prevention means having a main extension extending completely along the bisector to the respective nose cutting edge.

2. The turning insert according to claim 1, wherein indentations are formed in each side surface between each pair of nose cutting edges.

3. The turning insert according to claim 1, wherein a distance, measured in a plane perpendicular to the reference plane, between the top surface of the protrusion and the lowest point of the first cutting edge is 0.28-0.35 mm.

4. The turning insert according to claim 1, wherein in a top view, a distance from the first cutting edge to the first chip breaker wall is increasing away from the nose cutting edge.

5. A turning insert comprising:
a top surface;
an opposite bottom surface including rotation prevention means arranged to prevent or at least reduce rotation or movement of the turning insert;
side surfaces connecting the top surface and the bottom surface;
a reference plane located parallel to and between the top surface and the bottom surface, an area of the top surface being greater than an area of the bottom surface, wherein both the top and bottom areas are axially projected on the reference plane;
a center axis extending perpendicular to the reference plane and intersecting the reference plane;
three nose portions formed symmetrically around the center axis, each nose portion including a first cutting edge, a second cutting edge and a convex nose cutting edge connecting the first and second cutting edges, wherein in a top view the first and second cutting edges on a same nose portion form a nose angle of 25-50° relative to each other, wherein a distance from the first cutting edge to the reference plane decreases as a distance from the nose cutting edge increases, the turning insert being single-sided such that the first and second cutting edges are formed only at a border of the top surface;
a bisector extending equidistantly from each of the first and second cutting edges, and wherein each bisector intersects the center axis; and
a first side surface including a first clearance surface adjacent to the first cutting edge, a third clearance surface, and a second clearance surface located between the first clearance surface and the third clearance surface, wherein the third clearance surface forms an angle ε in relation to the bottom surface measured in a plane perpendicular to the first cutting edge, wherein the second clearance surface forms an angle σ in relation to the bottom surface measured in a plane perpendicular to the first cutting edge, wherein the first clearance surface forms an angle γ in relation to the bottom surface measured in a plane perpendicular to the first cutting edge, wherein σ>ε, and wherein the side surfaces of each nose portion are configured symmetrically in relation to a plane perpendicular to the reference plane and including the bisector.

6. The turning insert according to claim 1, wherein the exactly three rotation prevention means is a plurality of rotation prevention grooves, each groove having a main extension along a respective bisector intersecting the center axis between adjacent first and second cutting edges.

7. The turning insert according to claim 1, the protrusion including a first chip breaker wall facing the first cutting edge, wherein the top surface includes bumps, wherein the bumps are formed between the bisector and the first cutting edge.

8. The turning insert according to claim 1, wherein the nose angle is less than 35°.

9. The turning insert according to claim 1, wherein in a side view the first cutting edge forms an angle relative to the reference plane of 1-4° such that a distance from the first cutting edge to the reference plane is continuously decreasing away from the nose cutting edge.

10. The turning insert according to claim 1, wherein the first cutting edge is linear or straight in a top view from a first end point, the first cutting edge being connected to the nose cutting edge, up to a second end point, where the first cutting edge intersects an indention formed in a side surface between a pair of nose cutting edges, and wherein a distance from the first cutting edge to the reference plane is continuously decreasing from said first end point up to said second end point.

11. A turning tool comprising the turning insert according to claim 1 and a tool body, the tool body having a front end and an opposite rear end, a main extension along a longitudinal axis extending from the front end to the rear end, an insert seat formed in the front end in which the turning insert is mountable such that a bisector of an active nose portion forms an angle θ of 35-55° in relation to the longitudinal axis of the tool body.

12. The turning tool according to claim 11, wherein the sum of the angle θ and half the nose angle α is equal or greater than 50°, and equal or smaller than 70°.

13. A method to machine a metal work piece with the turning insert according to claim 1, comprising the steps of:
clamping the metal work piece at a first end;
rotating the metal work piece around a rotational axis;
positioning the first cutting edge of an active nose portion such that the first cutting edge forms a smaller angle relative to the rotational axis-of the metal work piece than the angle formed by the second cutting edge relative to the rotational axis of the metal work piece; and
moving the turning insert in a direction perpendicular to and away from the rotational axis such that the second cutting edge is active.

14. A method to machine a metal work piece with the turning insert according to claim 1, comprising the steps of:
clamping the metal work piece at a first end;
rotating the metal work piece around a rotational axis;
positioning the first cutting edge of an active nose portion such that the first cutting edge forms a smaller angle relative to the rotational axis of the metal work piece than the angle formed by the second cutting edge relative to the rotational axis of the metal work piece; and moving the turning insert in a direction parallel to the rotational axis and away from the first end such that the first cutting edge is active.

15. The turning insert according to claim 1, wherein the exactly three rotation prevention means are selected from one or more ridges, grooves, protrusions or cavities, and a combination thereof.

16. The turning insert according to claim 1, wherein the exactly three rotation prevention means is selected from one or more ridges, grooves, protrusions, cavities or a combination thereof.

17. The turning insert according to claim 1, wherein the exactly three rotation prevention means is one or more ridges each having a main extension extending towards the center axis.

18. The turning insert according to claim 1, wherein the exactly three rotation prevention means extends to at least one of the side surfaces.

19. The turning insert according to claim 1, wherein the turning insert is single-sided.

* * * * *